(12) United States Patent
Tang

(10) Patent No.: US 11,240,807 B2
(45) Date of Patent: Feb. 1, 2022

(54) METHOD FOR SELECTING CARRIER AND COMMUNICATION DEVICE

(71) Applicant: Guangdong OPPO Mobile Telecommunications Corp., Ltd., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 12 days.

(21) Appl. No.: 16/776,082

(22) Filed: Jan. 29, 2020

(65) Prior Publication Data
US 2020/0196310 A1  Jun. 18, 2020

Related U.S. Application Data

(63) Continuation of application No. PCT/CN2017/101903, filed on Sep. 15, 2017.

(51) Int. Cl.
  *H04W 72/04*  (2009.01)
  *H04W 24/08*  (2009.01)
  *H04W 28/08*  (2009.01)
  *H04W 72/08*  (2009.01)

(52) U.S. Cl.
  CPC ....... *H04W 72/0453* (2013.01); *H04W 24/08* (2013.01); *H04W 28/08* (2013.01); *H04W 72/0486* (2013.01); *H04W 72/085* (2013.01)

(58) Field of Classification Search
  CPC .......... H04W 72/0453; H04W 72/085; H04W 28/08; H04W 24/08
  See application file for complete search history.

(56) References Cited

U.S. PATENT DOCUMENTS

| 6,810,030 B1 | 10/2004 | Kuo |
| 8,666,317 B2 | 3/2014 | Choudhury |
| 8,948,044 B2 | 2/2015 | Bansal et al. |

(Continued)

FOREIGN PATENT DOCUMENTS

| CN | 1230830 A | 10/1999 |
| CN | 1469570 A | 1/2004 |

(Continued)

OTHER PUBLICATIONS

European Patent Application No. 18856998.2, "extended search report", dated Sep. 9, 2020, 18 pages.

(Continued)

*Primary Examiner* — Walli Z Butt
*Assistant Examiner* — Thad N Defauw
(74) *Attorney, Agent, or Firm* — Perkins Coie LLP

(57) ABSTRACT

This application discloses a carrier selection method and a communications device. The method includes: obtaining channel busy ratios (CBRs) of a plurality of candidate carriers and selecting, when a value of a resource reselection counter C_resel is equal to 0, a carrier from the plurality of candidate carriers according to the CBRs of the plurality of candidate carriers. Therefore, the carrier is selected from the plurality of candidate carriers according to the CBRs of the plurality of candidate carriers, thereby reducing carrier switching frequency and ensuring system stability while the carrier is selected.

17 Claims, 9 Drawing Sheets

(56) References Cited

U.S. PATENT DOCUMENTS

| | | | |
|---|---|---|---|
| 9,326,290 | B2 | 4/2016 | Zhu |
| 2011/0038273 | A1 | 2/2011 | Li et al. |
| 2012/0155272 | A1 | 6/2012 | Quan |
| 2013/0078924 | A1 | 3/2013 | Choudhury et al. |
| 2013/0294247 | A1 | 11/2013 | Zhu |
| 2014/0119210 | A1 | 5/2014 | Bansal et al. |
| 2015/0249990 | A1 | 9/2015 | Kadiyala et al. |
| 2015/0289173 | A1* | 10/2015 | Tyagi ............... H04W 36/0061 455/437 |
| 2016/0095007 | A1 | 3/2016 | Tian et al. |
| 2016/0150442 | A1 | 5/2016 | Kwan et al. |
| 2017/0272971 | A1 | 9/2017 | Boban |
| 2017/0367005 | A1 | 12/2017 | Shi et al. |
| 2019/0075548 | A1 | 3/2019 | Lee et al. |
| 2019/0116475 | A1 | 4/2019 | Lee et al. |
| 2019/0208441 | A1 | 7/2019 | Wang et al. |
| 2019/0313405 | A1* | 10/2019 | Li ......................... H04W 24/08 |
| 2020/0169986 | A1* | 5/2020 | Lee ................... H04W 72/0493 |

FOREIGN PATENT DOCUMENTS

| | | |
|---|---|---|
| CN | 101772078 A | 7/2010 |
| CN | 102056174 A | 5/2011 |
| CN | 104093185 A | 10/2014 |
| CN | 104093190 A | 10/2014 |
| CN | 104320853 A | 1/2015 |
| CN | 104684085 A | 6/2015 |
| CN | 106341844 | 1/2017 |
| CN | 106470485 A | 3/2017 |
| CN | 107079265 | 8/2017 |
| EP | 3439416 A1 | 2/2019 |
| TW | 201628426 A | 8/2016 |
| WO | 2016198320 | 12/2016 |
| WO | 2017150959 A1 | 9/2017 |
| WO | 2018030825 A1 | 2/2018 |

OTHER PUBLICATIONS

ZTE, "Discussion on congestion control of PC5 carrier", 3GPP TSG-RAN WG1 Meeting #86bis R1-1609808, Oct. 10-14, 2016, 3 pages, Lisbon, Portugal.

Samsung, "Congestion control in zone-based resource pool", 3GPP TSG RAN WG2 #96 R2-168044. Nov. 14-18, 2016, 2 pages, Reno, USA.

Catt, "Multi0carrier Operation for Sidelink V2X", 3GPP TSG-RAN WG2 Meeting #96 R2-168109, Nov. 14-18, 2016, 4 pages, Reno, USA.

Guangdong Oppo Mobile Elecommunications Corp., Ltd., "Mode 4 Support in eV2X carrier aggression", 3GPP TSG RAN WG1 Meeting #90 R1-1713251, Aug. 21-25, 2017, 5 pages, Prague, CZ.

Guangdong Oppo Mobile Elecommunications Corp., Ltd., "Mode 4 Support in eV2X carrier aggression", 3GPP TSG RAN WG1 Meeting #90bis R1-1718036, Oct. 9-13, 2017, 4 pages, Prague, CZ.

European Patent Application No. 18856998.2, "Partial Search Report", dated Jun. 24, 2020, 17 pages.

International Patent Application No. PCT/CN2017/103819, "International Search Report", dated Jun. 8, 2018, 9 pages.

International Patent Application No. PCT/CN2018/080715, "International Search Report", dated Jun. 21, 2018, 10 pages.

International Patent Application No. PCT/CN2018/085497, "International Search Report", dated Jul. 5, 2018, 13 pages.

LG Electronics Inc., Change Request for "Introduction of V2X feature in 36.300", 3GPP TSG-RAN2 Meeting #97 R2-1702414, Feb. 13-17, 2017, 5 pages, Athens, Greece.

NEC, "Load balancing via dynamic resource sharing for multiple carriers and pools", 3GPP TSG RAN WG1 Meeting #87 R1-1611722, Nov. 14-18, 2016, 4 pages, Reno, USA.

Qualcomm Incorporated, "Resource reservation interval and resource reselection counter", 3GPP TSG-RAN WG2 Meeting #96 R2-167886, Nov. 14-18, 2106, 6 pages, Reno, USA.

Ericsson, "Report from [96#61][LTE/V2X]—Multi-carrier", 3GPP TSG-RAN WG2 #97 Tdoc R2-1701096, Feb. 13-17, 2017, 22 pages, Athens, Greece.

LG Electronics Inc., Change Request for "Introduction of LTE-based V2X services", 3GPP TSG-RAN WG2 Meeting #97 R2-1702426, Feb. 13-17, 2017, 17 pages, Athens, Greece.

European extended search report for Application No. 17925140.0, dated Apr. 22, 2020, 6 pages.

CATT:"Carrier configuration and carrier selection in eV2X CA", 3GPP TSG-RAN WG2 #99,Berlin, Germany, Aug. 21-25, 2017, R2-1708052.

CATT:"Discussion on carrier aggregation for mode 4 in V2X Phase 2", 3GPP TSG RAN WG1 Meeting#90, Prague, Czechia, Aug. 21-25, 2017, R1-1712339.

Huawei, CATT, LG Electronics, HiSilicon, China Unicom,Revision of WI: V2X phase 2 based on LTE,3GPP TSG RAN Meeting #76,Florida, USA, Jun. 5-8, 2017,RP-171069.

Duan et al., "An Adaptive MAC Protocol with Fuzzy Logic in Multi-rate WLAN", Computer Engineering, Available Online at: http://en.cnki.com.cn/Article_en/CJFDTOTAL-JSJC200603040.htm, Feb. 28, 2006, 4 pages.

International Patent Application No. PCT/CN2017/101903, "International Search Report", dated Jun. 12, 2018, 2 pages.

English translation of the Written Opinion of the International Search Authority in the international application No. PCT/CN2017/101903, dated Jun. 12, 2018.

English translation of the Written Opinion of the International Search Authority in the international application No. PCT/CN2017/103819, dated Jun. 8, 2018.

English translation of the Written Opinion of the International Search Authority in the international application No. PCT/CN2018/080715, dated Jun. 21, 2018.

English translation of the Written Opinion of the International Search Authority in the international application No. PCT/CN2018/085497, dated Jul. 5, 2018.

First Office Action of the European application No. 17925140.0, dated Dec. 22, 2020.

First Office Action of the U.S. Appl. No. 16/803,857, dated Jul. 21, 2021.

Second Office Action of the European application No. 17925140.0, dated May 14, 2021.

Office Action of the Indian application No. 202017015840, dated Jul. 26, 2021.

First Office Action of the Chilean application No. 202000669, dated May 19, 2021.

Qualcomm Incorporated: "Resource reselection counter and triggering conditions", 3GPP Draft; R2-170118 Resource Selection Triggers. 3rd Generation Partnership Project (3GPP), vol. RAN WG2, No. Athens, Greece; Feb. 13, 2017-Feb. 17, 2017 Feb. 3, 2017 (Feb. 3, 2017), XP051223038. 3 pages.

Third Office Action of the European application No. 17925140.0, dated Aug. 25, 2021. 6 pages.

Ericsson, Discussion on PC5 Multi—Carrier[Online], 3GPP TSG RAN WG2 #97 R2-1700932, [Search Date Mar. 24, 2021.], [Search Date <URL: https://www.3gpp.org/ftp/tsg_ran/WG2_RL2/TSGR2_97/Docs/R2], Section 2.2.1, Section 1700932.zip>, 2.2.2. 4 pages.

3rd Generation Partnership Project; Technical Specification Group Radio Access Network; Evolved Universal Terrestrial Radio Access (E-UTRA); Medium Access Control (MAC) protocol specification(Release 14), 3GPP TS 36.321 V14.1.0 (Dec. 2016), Dec. 30, 2016. 98 pages.

Panasonic, Discussion on UE behaviour of mode 4 in case of multiple carriers[online[, 3GPP TSG RAN WG1 #90 R1-1713853, 2017, 8 months, [Search Date Mar. 24, 2021.],, Internet <URL: https://www.3gpp.org/ftp/tsg_ran/WG1_RL1/SGR1_90/Docs/R1], [Search Date] 11 1713853. zip>, 2. 3 pages.

Samsung, Mode -3 support in V2X CA[online], 3GPP TSG RAN WG1 #90 R1-1713525, 2017, Jan. 12, 08 [Search Date Aug. 24, 2021.], Internet <URL: https://www.3gpp.org/ftp/tsg_ran/WG1_RL1/TSGR1_90/Docs/R1_Section] 1713525. zip>, 2. 3 pages.

First Office Action of the Japanese application No. 2020-514214, dated Aug. 27, 2021. 8 pages with English translation.

Second Office Action of the Chilean application No. 202000669, dated Sep. 21, 2021. 19 pages with English translation.

(56) References Cited

OTHER PUBLICATIONS

First Office Action of the European application No. 18856998.2, dated Sep. 23, 2021. 6 pages.
Office Action of the Indian application No. 202017015461, dated Nov. 3, 2021. 6 pages with English translation.
First Office Action of the Taiwanese application No. 107132556, dated Oct. 29, 2021. 8 pages with English translation.

* cited by examiner

METHOD FOR SELECTING CARRIER AND COMMUNICATION DEVICE

CROSS-REFERENCE TO RELATED APPLICATION

This application is a continuation of and claims priority to International Patent Application No. PCT/CN2017/101903, filed on Sep. 15, 2017, the contents of which is hereby incorporated by reference in its entirety.

BACKGROUND OF THE INVENTION

Technical Field

Embodiments of this application relate to the wireless communications field, and more specifically, to a carrier selection method and a communications device.

Related Art

An Internet of Vehicles or Vehicle-to-Everything (V2X) communications system is a sidelink (SL) transmission technology based on device-to-device (D2D) communication. Different from a conventional manner in which a base station receives or sends data in a Long Term Evolution (Long Term Evolution, LTE) system, the Internet of Vehicles system uses a terminal-to-terminal direct communication manner. Therefore, spectrum efficiency is higher and a transmission delay is lower.

In the Internet of Vehicles system supporting multicarrier transmission, a terminal device may currently transmit data by using one or more of a plurality of candidate carriers. Therefore, how a terminal device or a base station selects a carrier becomes a problem that urgently needs to be resolved.

SUMMARY OF THE INVENTION

Embodiments of this application provide a carrier selection method and a communications device, where the communications device can effectively select a carrier and maintain system stability.

According to a first aspect, a carrier selection method is provided, including: obtaining channel busy ratios (CBR) of a plurality of candidate carriers; performing filtering processing on the CBRs of the plurality of carriers, to obtain CBRs of the plurality of carriers after filtering; and selecting a carrier from the plurality of carriers according to the CBRs of the plurality of carriers that are obtained after filtering.

Therefore, filtering processing is performed on measured results of the CBRs of the plurality of carriers, and the carrier is selected from the plurality of carriers according to the CBRs of the plurality of carriers that are obtained after filtering processing, thereby reducing carrier switching frequency and ensuring system stability while the carrier is selected.

In a possible implementation, the performing filtering processing on the CBRs of the plurality of carriers includes: performing smooth filtering on the CBRs of the plurality of carriers.

In a possible implementation, a CBR of each of the plurality of carriers after smooth filtering is: CBR_new=a× CBR_old+(1−a)×CBR_current, where CBR_new is a CBR of each carrier that is obtained after filtering, CBR_current is a CBR of each carrier before filtering, CBR_old is a CBR of each carrier that is obtained after filtering during previous carrier selection, and a is a filtering coefficient and $0 \leq a \leq 1$.

In a possible implementation, before the selecting a carrier from the plurality of carriers according to the CBRs of the plurality of carriers that are obtained after filtering, the method further includes: determining whether a difference between a CBR of a first carrier that is obtained after filtering and a CBR of a second carrier that is obtained after filtering exceeds a preset threshold, where the first carrier is a carrier used in current data transmission, and the second carrier is any carrier other than the first carrier in the plurality of carriers; and selecting a carrier from the plurality of carriers according to the CBRs of the plurality of carriers that are obtained after filtering includes: selecting, if the difference between the CBR of the first carrier that is obtained after filtering and the CBR of the second carrier that is obtained after filtering exceeds the preset threshold, a carrier from the plurality of carriers according to the CBRs of the plurality of carriers that are obtained after filtering.

In this embodiment, whether carrier selection is performed is determined based on a difference between CBRs of a current carrier and another carrier, and the carrier is selected based on the CBRs that are obtained after the filtering processing when the difference between the CBRs satisfies a condition, further reducing carrier switching frequency and ensuring system stability.

In a possible implementation, the method is performed by a terminal device, and before the determining whether a difference between a CBR of a first carrier that is obtained after filtering and a CBR of a second carrier that is obtained after filtering exceeds a preset threshold, the method further includes: obtaining, by the terminal device, the preset threshold preconfigured in the terminal device; or receiving, by the terminal device, configuration information sent by a network device, where the configuration information includes the preset threshold.

In a possible implementation, the method is performed by a network device, and the method further includes: sending, by the network device, configuration information to the terminal device, where the configuration information includes the preset threshold.

In a possible implementation, the selecting a carrier from the plurality of carriers according to the CBRs of the plurality of carriers that are obtained after filtering includes: selecting, when a value of a resource reselection counter C_resel is equal to 0, a carrier from the plurality of carriers according to the CBRs of the plurality of carriers that are obtained after filtering.

In this embodiment, a carrier selection process does not rely on a probability resource keep ProbResourceKeep parameter, and instead, whether the carrier selection needs to be performed currently is determined based on the resource reselection counter C_resel. When the carrier selection needs to be performed, the carrier is selected based on the CBRs that are obtained after filtering processing, reducing carrier switching frequency and ensuring system stability.

In a possible implementation, each of the plurality of carriers is configured with a corresponding C_resel, where the selecting, when a value of C_resel is equal to 0, a carrier from the plurality of carriers according to the CBRs of the plurality of carriers includes: when a value of any C_resel in the plurality of C_resel configured for the plurality of carriers is equal to 0, selecting a carrier from the plurality of carriers according to the CBRs of the plurality of carriers that are obtained after filtering.

In a possible implementation, the plurality of carriers are configured with a same C_resel, where the selecting, when a value of C_resel is equal to 0, a carrier from the plurality of carriers according to the CBRs of the plurality of carriers includes: when a value of the same C_resel is equal to 0, selecting a carrier from the plurality of carriers according to the CBRs of the plurality of carriers that are obtained after filtering.

In a possible implementation, before the selecting a carrier from the plurality of carriers according to the CBRs of the plurality of carriers that are obtained after filtering, the method further includes: determining, when a value of C_resel is equal to 0, whether a difference between a CBR of a first carrier that is obtained after filtering and a CBR of a second carrier that is obtained after filtering exceeds a preset threshold, where the first carrier is a carrier used in current data transmission, and the second carrier is any carrier other than the first carrier in the plurality of carriers; and selecting a carrier from the plurality of carriers according to the CBRs of the plurality of carriers that are obtained after filtering includes: selecting, if the difference between the CBR of the first carrier that is obtained after filtering and the CBR of the second carrier that is obtained after filtering exceeds the preset threshold, a carrier from the plurality of carriers according to the CBRs of the plurality of carriers that are obtained after filtering.

In this embodiment, whether the carrier needs to be selected currently is determined based on the resource reselection counter C_resel, and whether the difference between the CBRs of the current carrier and another carrier satisfies a condition is determined when the carrier needs to be selected. When the difference between the CBRs satisfies the condition, the carrier is selected based on the CBRs that are obtained after filtering processing, further reducing carrier switching frequency and ensuring system stability.

In a possible implementation, the method is performed by the terminal device, and before the determining whether a difference between a CBR of a first carrier that is obtained after filtering and a CBR of a second carrier that is obtained after filtering exceeds a preset threshold, the method further includes: obtaining, by the terminal device, the preset threshold preconfigured in the terminal device; or receiving, by the terminal device, configuration information sent by a network device, where the configuration information includes the preset threshold.

In a possible implementation, the method is performed by the network device, and the method further includes: sending, by the network device, configuration information to the terminal device, where the configuration information includes the preset threshold.

In a possible implementation, each of the plurality of carriers is configured with a corresponding C_resel, where the determining, when a value of C_resel is equal to 0, whether a difference between a CBR of a first carrier that is obtained after filtering and a CBR of a second carrier that is obtained after filtering exceeds a preset threshold includes: when a value of any C_resel in the plurality of C_resel configured for the plurality of carriers is equal to 0, determining whether the difference between the CBR of the first carrier that is obtained after filtering and the CBR of the second carrier that is obtained after filtering exceeds the preset threshold.

In a possible implementation, the plurality of carriers are configured with a same C_resel, where the determining, when a value of C_resel is equal to 0, whether a difference between a CBR of a first carrier that is obtained after filtering and a CBR of a second carrier that is obtained after filtering exceeds a preset threshold includes: when a value of the same C_resel is equal to 0, determining whether the difference between the CBR of the first carrier that is obtained after filtering and the CBR of the second carrier that is obtained after filtering exceeds the preset threshold.

In a possible implementation, the selecting a carrier from the plurality of carriers according to the CBRs of the plurality of carriers that are obtained after filtering includes: selecting a carrier having a smallest CBR obtained after filtering as a to-be-used carrier from the plurality of carriers according to the CBRs of the plurality of carriers that are obtained after filtering.

In a possible implementation, the method is performed by the terminal device, and the obtaining CBRs of the plurality of candidate carriers includes: measuring, by the terminal device, the CBRs of the plurality of carriers, to obtain the CBRs of the plurality of carriers.

In a possible implementation, the method is performed by the network device, and the obtaining CBRs of the plurality of candidate carriers includes: receiving, by the network device, the CBRs of the plurality of carriers that are reported by the terminal device.

In a possible implementation, the carrier selection process is irrelevant to a probability resource keep ProbResourceKeep parameter.

According to a second aspect, a carrier selection method is provided, including: obtaining channel busy ratios (CBR) of a plurality of candidate carriers; determining whether a difference between a CBR of a first carrier and a CBR of a second carrier exceeds a preset threshold, where the first carrier is a carrier used in current data transmission, and the second carrier is any carrier other than the first carrier in the plurality of carriers; and selecting, if the difference between the CBR of the first carrier and the CBR of the second carrier exceeds the preset threshold, a carrier from the plurality of carriers according to the CBRs of the plurality of carriers.

Therefore, whether carrier selection is performed is determined based on a difference between CBRs of a current carrier and another carrier, and the carrier is selected only when the difference between the CBRs satisfies a condition, reducing carrier switching frequency and ensuring system stability.

In a possible implementation, the determining whether a difference between a CBR of a first carrier and a CBR of a second carrier exceeds a preset threshold includes: determining, when a value of a resource reselection counter C_resel is equal to 0, whether the difference between the CBR of the first carrier and the CBR of the second carrier exceeds the preset threshold.

In this embodiment, whether the carrier needs to be selected currently is determined based on the resource C_resel, and whether the difference between the CBRs of the current carrier and another carrier satisfies a condition is determined when the carrier needs to be selected. When the difference between the CBRs satisfies the condition, the carrier is selected based on CBRs of different carriers, reducing carrier switching frequency and ensuring system stability.

In a possible implementation, each of the plurality of carriers is configured with a corresponding C_resel, where the determining, when a value of C_resel is equal to 0, whether the difference between the CBR of the first carrier that is obtained after filtering and the CBR of the second carrier that is obtained after filtering exceeds the preset threshold includes: when a value of any C_resel in the plurality of C_resel configured for the plurality of carriers is equal to 0, determining whether the difference between the CBR of the first carrier that is obtained after filtering and the CBR of the second carrier that is obtained after filtering exceeds the preset threshold.

In a possible implementation, the plurality of carriers are configured with a same C_resel, where the determining, when a value of C_resel is equal to 0, whether the difference between the CBR of the first carrier that is obtained after filtering and the CBR of the second carrier that is obtained after filtering exceeds the preset threshold includes: when a value of the same C_resel is equal to 0, determining whether the difference between the CBR of the first carrier that is obtained after filtering and the CBR of the second carrier that is obtained after filtering exceeds the preset threshold.

In a possible implementation, the selecting, if the difference between the CBR of the first carrier and the CBR of the second carrier exceeds the preset threshold, a carrier from the plurality of carriers according to the CBRs of the plurality of carriers includes: selecting, if the difference between the CBR of the first carrier and the CBR of the second carrier exceeds the preset threshold for preset duration, a carrier from the plurality of carriers according to the CBRs of the plurality of carriers.

In a possible implementation, the selecting a carrier from the plurality of carriers includes: selecting a carrier having a smallest CBR as a to-be-used carrier from the plurality of carriers according to the CBRs of the plurality of carriers.

In a possible implementation, the method is performed by the terminal device, and the obtaining CBRs of the plurality of candidate carriers includes: measuring, by the terminal device, the CBRs of the plurality of carriers, to obtain the CBRs of the plurality of carriers.

In a possible implementation, before the determining whether a difference between a CBR of a first carrier and a CBR of a second carrier exceeds a preset threshold, the method further includes: obtaining, by the terminal device, the preset threshold preconfigured in the terminal device; or receiving, by the terminal device, configuration information sent by a network device, where the configuration information includes the preset threshold.

In a possible implementation, the method is performed by the network device, and the obtaining CBRs of the plurality of candidate carriers includes: receiving, by the network device, the CBRs of the plurality of carriers that are reported by the terminal device.

In a possible implementation, the method further includes: sending, by the network device, configuration information to the terminal device, where the configuration information includes the preset threshold.

In a possible implementation, the carrier selection process is irrelevant to a probability resource keep ProbResourceKeep parameter.

According to a third aspect, a carrier selection method is provided, including: a carrier selection method, where the method includes: obtaining channel busy ratios (CBR) of a plurality of candidate carriers; and selecting, when a value of a resource reselection counter C_resel is equal to 0, a carrier from the plurality of carriers according to the CBRs of the plurality of carriers.

Therefore, a carrier selection process does not rely on a probability resource keep ProbResourceKeep parameter, and instead, whether the carrier selection needs to be performed currently is determined based on the resource reselection counter C_resel, implementing effective carrier selection and reducing system complexity.

In a possible implementation, each of the plurality of carriers is configured with a corresponding C_resel, where the selecting, when a value of C_resel is equal to 0, a carrier from the plurality of carriers according to the CBRs of the plurality of carriers includes: when a value of any C_resel in the plurality of C_resel configured for the plurality of carriers is equal to 0, selecting a carrier from the plurality of carriers according to the CBRs of the plurality of carriers.

In a possible implementation, the plurality of carriers are configured with a same C_resel, where the selecting, when a value of C_resel is equal to 0, a carrier from the plurality of carriers according to the CBRs of the plurality of carriers includes: when a value of the same C_resel is equal to 0, selecting a carrier from the plurality of carriers according to the CBRs of the plurality of carriers.

In a possible implementation, the selecting a carrier from the plurality of carriers according to the CBRs of the plurality of carriers includes: selecting a carrier having a smallest CBR as the to-be-used carrier from the plurality of carriers according to the CBRs of the plurality of carriers.

In a possible implementation, the method is performed by the terminal device, and the obtaining CBRs of the plurality of candidate carriers includes: measuring, by the terminal device, the CBRs of the plurality of carriers, to obtain the CBRs of the plurality of carriers.

In a possible implementation, the method is performed by the network device, and the obtaining CBRs of the plurality of candidate carriers includes: receiving, by the network device, the CBRs of the plurality of carriers that are reported by the terminal device.

In a possible implementation, the carrier selection process is irrelevant to a probability resource keep ProbResourceKeep parameter.

According to a fourth aspect, a communications device is provided. The communications device may perform the operation of the communications device according to the first aspect or any optional implementation of the first aspect. Specifically, the communications device may include modules or units configured to perform the operations according to the first aspect or any possible implementation of the first aspect.

According to a fifth aspect, a communications device is provided. The communications device may perform the operation of the communications device according to the second aspect or any optional implementation of the second aspect. Specifically, the communications device may include modules or units configured to perform the operations according to the second aspect or any possible implementation of the second aspect.

According to a sixth aspect, a communications device is provided. The communications device may perform the operation of the communications device according to the second aspect or any optional implementation of the second aspect. Specifically, the communications device may include modules or units configured to perform the operations according to the third aspect or any possible implementation of the third aspect.

According to a seventh aspect, a communications device is provided. The communications device includes: a processor, a transceiver, and a memory. The processor, the transceiver, and the memory communicate with each other through an internal connection path. The memory is configured to store an instruction, and the processor is configured to perform the instruction stored by the memory. When the processor performs the instruction stored by the memory, the execution enables the communications device to perform the method according to the first aspect or any possible implementation of the first aspect, or the execution enables the communications device to implement the communications device according to the fourth aspect.

According to an eighth aspect, a communications device is provided. The communications device includes: a processor, a transceiver, and a memory. The processor, the transceiver, and the memory communicate with each other through an internal connection path. The memory is configured to store an instruction, and the processor is configured to perform the instruction stored by the memory. When the processor performs the instruction stored by the memory, the execution enables the communications device to perform the method according to the second aspect or any possible implementation of the second aspect, or the execution enables the communications device to implement the communications device according to the fifth aspect.

According to a ninth aspect, a communications device is provided. The communications device includes: a processor, a transceiver, and a memory. The processor, the transceiver, and the memory communicate with each other through an internal connection path. The memory is configured to store an instruction, and the processor is configured to perform the instruction stored by the memory. When the processor performs the instruction stored by the memory, the execution enables the communications device to perform the method according to the third aspect or any possible implementation of the third aspect, or the execution enables the communications device to implement the communications device according to the sixth aspect.

According to a tenth aspect, a computer-readable storage medium is provided. The computer-readable storage medium stores a program, and the program enables the communications device to perform any carrier selection method according to the first aspect and the implementations of the first aspect.

According to an eleventh aspect, a computer-readable storage medium is provided. The computer-readable storage medium stores a program, and the program enables the communications device to perform any carrier selection method according to the second aspect and the implementations of the second aspect.

According to a twelfth aspect, a computer-readable storage medium is provided. The computer-readable storage medium stores a program, and the program enables the communications device to perform any carrier selection method according to the third aspect and the implementations of the third aspect.

According to a thirteenth aspect, a system-on-chip is provided. The system-on-chip includes an input interface, an output interface, a processor, and a memory, the processor is configured to perform an instruction stored by the memory, and when the instruction is executed, the processor may perform the method according to the first aspect or any possible implementation of the first aspect.

According to a fourteenth aspect, a system-on-chip is provided. The system-on-chip includes an input interface, an output interface, a processor, and a memory, the processor is configured to perform an instruction stored by the memory, and when the instruction is executed, the processor may perform the method according to the second aspect or any possible implementation of the second aspect.

According to a fifteenth aspect, a system-on-chip is provided. The system-on-chip includes an input interface, an output interface, a processor, and a memory, the processor is configured to perform an instruction stored by the memory, and when the instruction is executed, the processor may perform the method according to the third aspect or any possible implementation of the third aspect.

According to a sixteenth aspect, a computer program product including an instruction is provided. When the computer program product runs on a computer, the computer is enabled to perform the method according to the first aspect or any possible implementation of the first aspect.

According to a seventeenth aspect, a computer program product including an instruction is provided. When the computer program product runs on a computer, the computer is enabled to perform the method according to the second aspect or any possible implementation of the second aspect.

According to an eighteenth aspect, a computer program product including an instruction is provided. When the computer program product runs on a computer, the computer is enabled to perform the method according to the third aspect or any possible implementation of the third aspect.

DETAILED DESCRIPTION OF SPECIFIC EMBODIMENTS

The following describes the technical solutions in the embodiments of this application with reference to the accompanying drawings.

It should be understood that the technical solutions in the embodiments of this application may be applied to various communications systems, for example, a Global System of Mobile Communication (GSM) system, a Code Division Multiple Access (CDMA) system, a Wideband Code Division Multiple Access (WCDMA) system, a Long Term Evolution (LTE) system, an LTE frequency division duplex (FDD) system, LTE time division duplex (TDD), Universal Mobile Telecommunications System (UMTS), and a future 5G communications system.

This application describes the embodiments with reference to a terminal device. The terminal device may also be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device with a wireless communication function, a computing device, or another processing device connected to a wireless modem, an in-vehicle device, a wearable device, a terminal device in a future 5G network or a terminal device in a future evolved public land mobile network (PLMN) network, or the like.

This application describes the embodiments with reference to a network device. The network device may be a device configured to communicate with a terminal device, for example, may be a base transceiver station (BTS) in a GSM system or CDMA, a NodeB (NB) in a WCDMA system, or an evolved Node B (eNB) in an LTE system, or may be a relay station, an access point, an in-vehicle device, a wearable device, or a network side device in a future 5G network or a network side device in a future evolved PLMN network.

Figure 1:
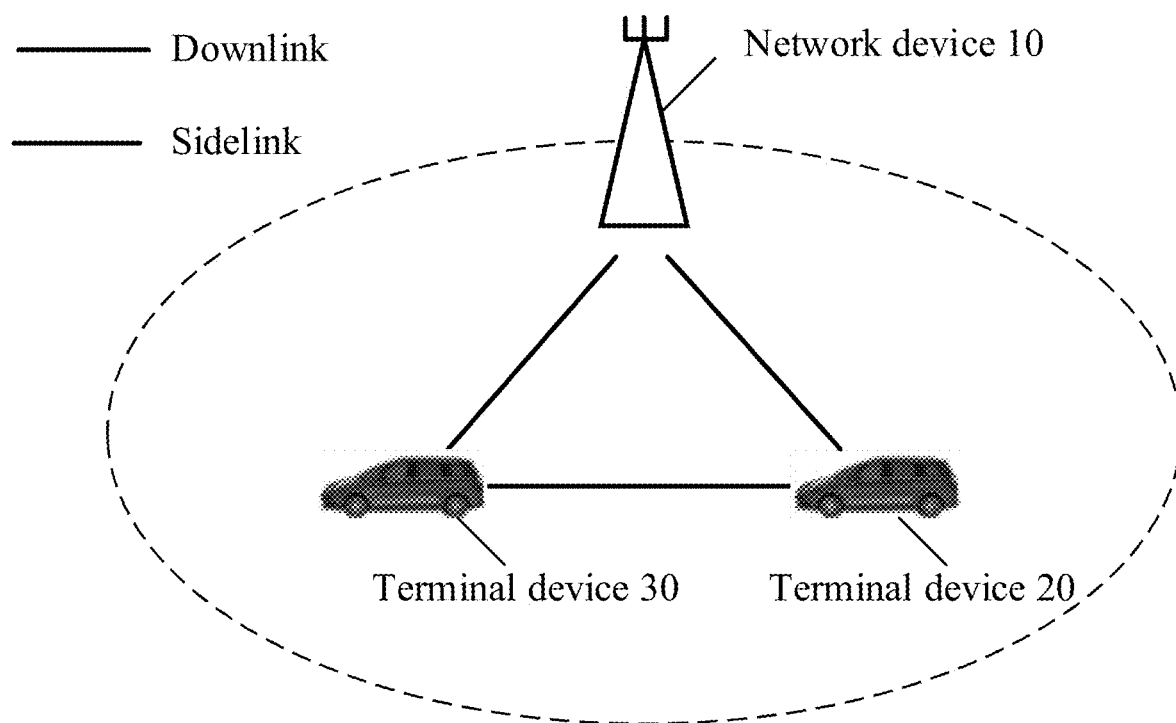
FIG. 1 is a schematic architectural diagram of an application scenario according to an embodiment of this application.
Figure 2:
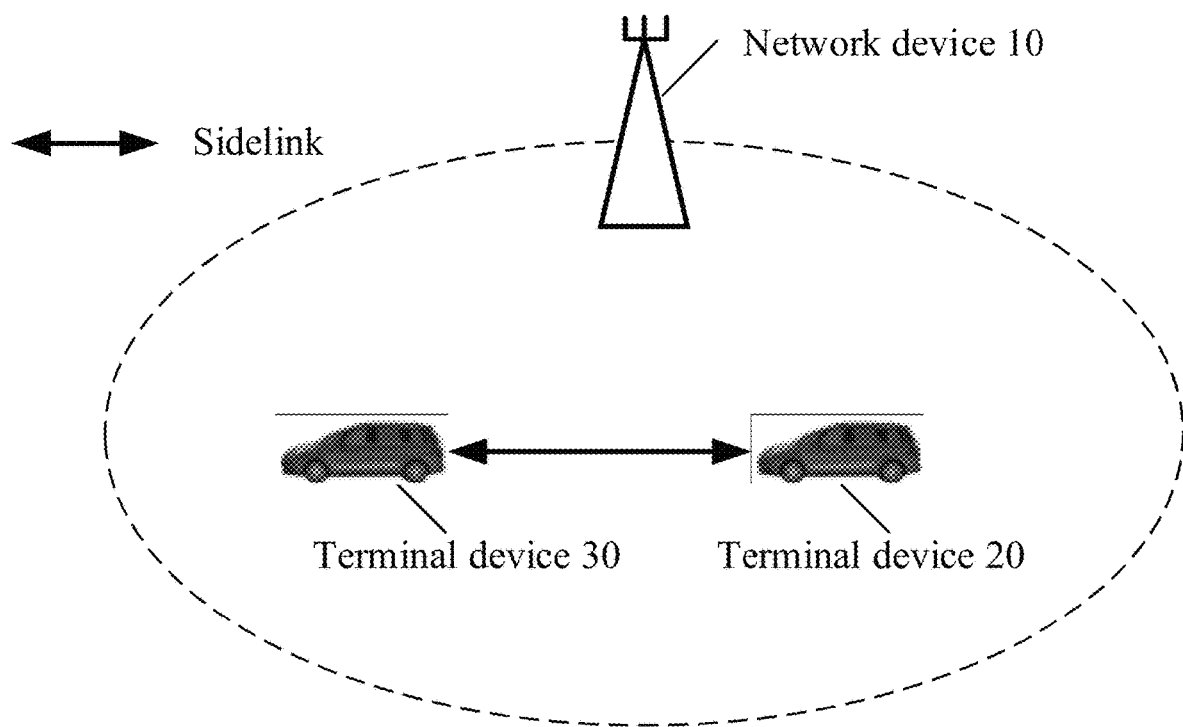
FIG. 2 is a schematic architectural diagram of another application scenario according to an embodiment of this application.

FIG. 1 and FIG. 2 are schematic diagrams of application scenarios according to embodiments of this application. FIG. 1 shows an example of a network device and two terminal devices. Optionally, a wireless communications system may include a plurality of network devices, and another quantity of terminal devices may be included within the coverage of each network device. This is not limited in the embodiments of the present invention. In addition, the wireless communications system may further include other network entities such as a mobility management entity (MME), a serving gateway (S-GW), and a packet data network gateway (P-GW), but the embodiments of the present invention are not limited thereto.

Specifically, the terminal device 20 and the terminal device 30 may communicate in a cellular communication mode or a D2D communication mode. In the cellular communication mode, the terminal device communicates with another terminal device through a cellular link with the network device. For example, as shown in FIG. 1, both the terminal device 20 and the terminal device 30 may perform data transmission with the network device. In the D2D communication mode, two terminal devices directly communicate through a D2D link, that is, a sidelink (SL) also referred to as a terminal direct link. For example, as shown in FIG. 1 or FIG. 2, the terminal device 20 and the terminal device 30 directly communicate through a sidelink.

D2D communication may be vehicle to vehicle ("V2V") communication or vehicle to everything (V2X) communication. In V2X communication, X may collectively refer to any device having a wireless receiving and sending capability, for example, but not limited to a wireless apparatus moving at a low speed, an in-vehicle device moving at a high speed, or a network control node having a wireless transmitting and receiving capability. It should be understood that the embodiments of the present invention are mainly applied to a V2X communication scenario, but may be also applied to any other D2D communication scenario, and this is limited in the embodiments of the present invention.

In an Internet of Vehicles system, there may be two types of terminal devices: a terminal device capable of sensing such as vehicle user equipment (VUE) or pedestrian user equipment (PUE), and a terminal device not capable of sensing, such as a PUE. A processing capability of the VUE is higher and the VUE is generally powered by a battery in the vehicle. However, a processing capability of the PUE is lower, and a main factor that needs to be considered for the PUE is reducing power consumption. Therefore, in an existing Internet of Vehicles system, the VUE is considered as fully capable of receiving and sensing, while the PUE is considered as partially or not capable of receiving and sensing. If the PUE is partially capable of sensing, a resource may be selected for the PUE by using a sensing method similar to that of the VUE, that is, an available resource is selected from a part of resource that can be sensed. If the PUE is not capable of sensing, a transmission resource is randomly selected for the PUE from a resource pool.

Two transmission modes are defined in a 3GPP protocol: a transmission mode 3 (mode 3) and a transmission mode 4 (mode 4). A transmission resource of a terminal device using the transmission mode 3 is allocated by a base station, and the terminal device sends data on a sidelink based on the resource allocated by the base station. The base station may allocate a resource of a single transmission for the terminal device or may allocate a resource of a semi-static transmission for the terminal device. A terminal device using the transmission mode 4 transmits data in a manner of sensing and reservation. The terminal device obtains an available resource set in the resource pool in a manner of sensing and randomly selects a resource from the available resource set for data transmission. A service in the Internet of Vehicles system has a periodic feature, and therefore the terminal device generally uses a manner of semi-static transmission. To be specific, after the terminal device selects a transmission resource, the resource will be used continuously in a plurality of transmission periods, thereby reducing a probability of resource reselection and resource conflict. The terminal device adds information for reserving a next-time transmission resource to control information that is to be transmitted this time, so that another terminal device may determine, by detecting the control information of the terminal device, whether the resource has been reserved and used by the terminal device, thereby reducing resource conflicts.

Figure 3:
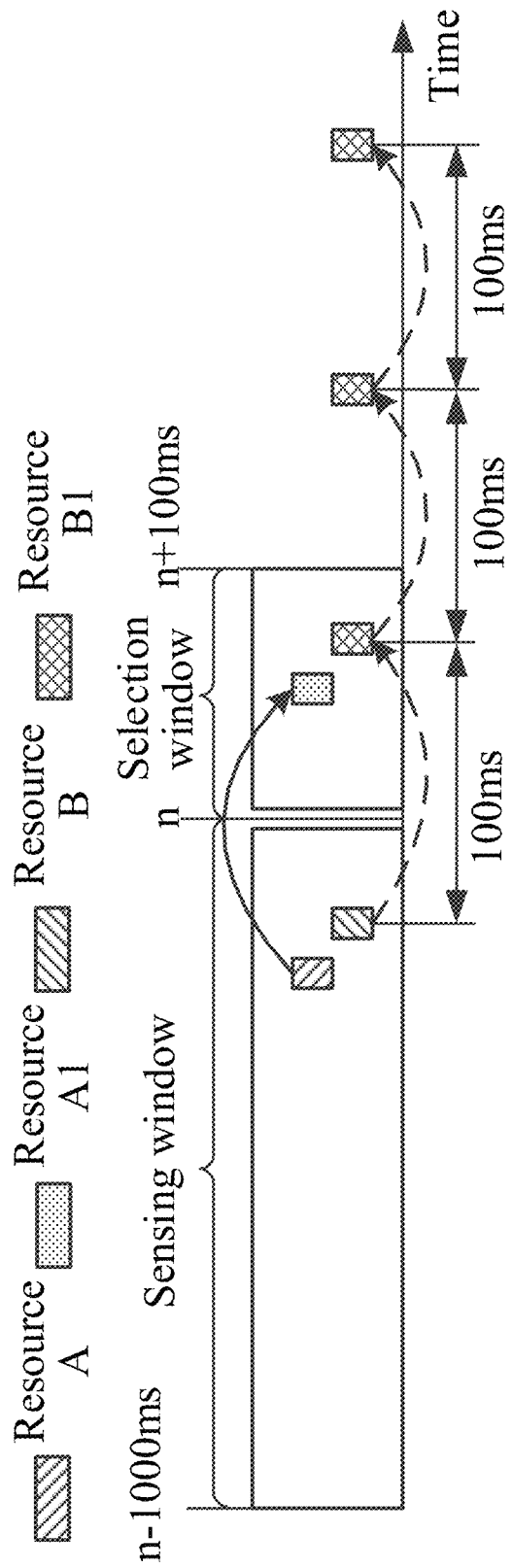
FIG. 3 is a schematic diagram of resource sensing and selection according to another embodiment of this application.

When the terminal device senses the resource, specifically refer to the method shown in FIG. 3. In a 3GPP protocol of Release-14, a resource needs to be selected when a new data packet arrives at a moment n in each sidelink process (one carrier may include two processes). The terminal device selects the resource in a time segment [n+T1, n+T2] ms based on a sensing result of a sensing window in previous is (that is, 1000 ms). The time segment [n+T1, n+T2] ms is referred to as a selection window, where T1 and T2, for example, may satisfy T1≤4 and 20≤T2≤100. The previous is mentioned in the following refers to the previous is for the moment n. A specific resource selection process is described below. A description is provided by using an example of a terminal device 20 sensing a resource of a terminal device 30, and it is assumed that all the resources that may be used by the terminal device 20 for transmission in the selection window are referred to as a candidate resource set.

(1) If no sensing result exists in some sub-frames in the sensing window, for example, the terminal device 20 transmits data thereof on the sub-frames, resources in the sub-frames in a corresponding position of the selection window are excluded outside the candidate resource set.

(2) If the terminal device 20 detects, in the sensing window of the previous 1s, a physical sidelink control channel (PSCCH) sent by the terminal device 30, a measurement value of a reference signal received power (RSRP) of a physical sidelink shared channel (PSSCH) corresponding to the PSCCH is greater than a preset threshold, and the detected PSCCH indicates that the terminal device 30 sending the PSCCH reserves a time frequency resource required for a next-time transmission, the terminal device 20 determines whether the time frequency resource reserved by the terminal device 30 in the selection window overlaps with the time frequency resource selected for data transmission in the selection window by the terminal device 20. If the time frequency resource reserved by the terminal device 30 in the selection window overlaps with the time frequency resource selected for data transmission in the selection window by the terminal device 20, a resource conflict occurs and the terminal device 20 excludes the time frequency resource in the selection window outside the candidate resource set.

It should be understood that if the terminal device 20 selects the time frequency resource used for data transmission in the selection window, and data needs to be transmitted on the plurality of time frequency resources distributed based on a time period T3, if the terminal device 30 reserves the plurality of time frequency resources distributed based on a time period T2, and the time period T3 satisfies T$3 \times$M=T$2 \times$N, where M and N are positive integers, the terminal device 20 excludes the plurality of time frequency resources distributed based on the time period T3 outside the candidate resource set.

(3) The terminal device 20 measures a received signal strength indicator (RSSI) for the rest resources in the candidate resource set, and sorts the rest resources in descending order of measurement results, and excludes resources whose energy is greater than a threshold outside the candidate resource set, for example, the first 80% resources having a high measured power are excluded outside the candidate resource set.

(4) The terminal device 20 randomly selects a time frequency resource for data transmission from the last rest candidate resource set.

It should be understood that a time frequency resource occupied by a data channel corresponding to a control channel is referred to as a time frequency resource (or a resource block) used to transmit the data channel. There may be a plurality of time frequency resources used to transmit the data channel in the candidate resource set in each selection window. For example, both the resources A1 and B1 in FIG. 3 can be referred to as a time frequency resource.

After the terminal device 20 selects a time frequency resource used for data transmission, the time frequency resource will be used for C_resel times in a subsequent transmission process, where C_resel is a resource reselection counter. Each time data is transmitted, a value of C_resel is decreased by 1, and when the value of C_resel is decreased to 0, the terminal device 20 generates a random number between [0, 1], and compares the random number with a probability resource keep (ProbResourceKeep) parameter. The parameter indicates a probability of continuing to use the resource by the terminal device. If a value of the random number is greater than the parameter, the terminal device 20 reselects a resource, and if the value of the random number is less than the parameter, the terminal device 20 may continue to use the time frequency resource for data transmission, and resets the value of C_resel at the same time.

In an Internet of Vehicles system supporting a multi-carrier transmission, regardless of whether the terminal device uses the transmission mode 3 or the transmission mode 4, one or more carriers in a plurality of candidate carriers may be used in current data transmission. The terminal device using the transmission mode 4 may select one or more carriers in the plurality of candidate carriers for the current data transmission, and the terminal device using the transmission mode 3 may perform the current data transmission based on one or more carriers selected by a base station.

The terminal device may measure a congestion level of the system such as a channel busy ratio (CBR), and the base station may instruct the terminal device to report the measurement result to the base station, so that the base station configures a transmission parameter, such as a modulation coding mode (MCS) allowed by the terminal device, a range of a number of available physical resource blocks (PBR), and a number of retransmission times, based on the CBR reported by the terminal device.

The CBR may be used by the terminal device for selecting a carrier, for example, the terminal device may select, based on a CBR measurement result of the plurality of carriers, a carrier with a lowest CBR for data transmission. However, the CBR of each carrier rapidly changes with the movement of the terminal device, or the CBR changes as the time changes. As a result, the terminal device frequently switches between the pluralities of carriers when selecting the carrier each time, causing an unstable system.

For the carrier selection method provided in the embodiment of this application, the terminal device or a network device may properly process the CBR and select the carrier based on the processed CBR, to effectively select the carrier and maintain a stable system at the same time.

Figure 4:
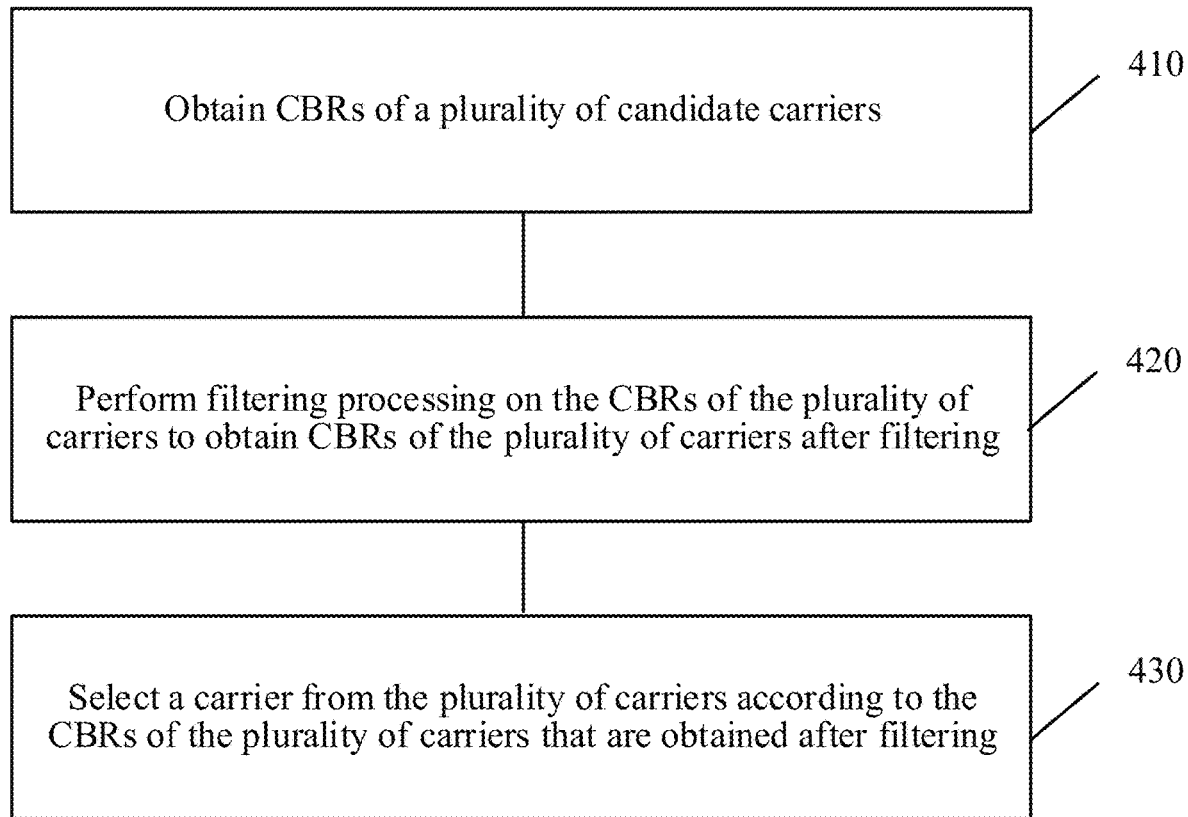
FIG. 4 is a schematic flowchart of a carrier selection method according to still another embodiment of this application.

FIG. 4 is a schematic flowchart of a carrier selection method according to an embodiment of this application. The method shown in FIG. 4 may be performed by a communications device. The communications device includes a terminal device or a network device, the terminal device may be, for example, the terminal device 20 or the terminal device 30 shown in FIG. 2, and the network device may be, for example, the network device 10 shown in FIG. 1 or FIG. 2. The following provides a description by using the terminal device as an example, but the method described in this application may also be performed by the network device or the like. As shown in FIG. 4, the carrier selection method includes:

410. Obtain channel busy ratios (CBR) of a plurality of candidate carriers.

420. Perform filtering processing on the CBRs of the plurality of carriers to obtain CBRs of the plurality of carriers after filtering.

430. Select a carrier from the plurality of carriers according to the CBRs of the plurality of carriers that are obtained after filtering.

Specifically, the terminal device obtains the CBRs of the plurality of carriers that may be used for data transmission, performs filtering processing the CBRs of the plurality of candidate carriers to obtain the CBRs of the plurality of carriers after the filtering processing, and then selects the carrier from the plurality of carriers according to the CBRs of the plurality of carriers that are obtained after filtering, to select a to-be-used carrier. If the selected to-be-used carrier is the same as the carrier currently used by the terminal device, carrier switching does not need to be performed, otherwise, the carrier switching is performed.

The CBR of each carrier may rapidly change with a position change of the terminal device or change as the time changes, filtering processing is performed for a measured value of the CBR of each carrier, so that the change of the CBR of each carrier tends to be smooth, thereby reducing carrier switching frequency and ensuring system stability while realizing carrier selection.

Optionally, if the method is performed by the terminal device, in 410, the obtaining CBRs of a plurality of candidate carriers includes: measuring, by the terminal device, the CBRs of the plurality of carriers to obtain the CBRs of the plurality of carriers.

For example, the terminal device measures the CBRs of the plurality of carriers and reports the CBRs to an upper layer, and the upper layer performs filtering processing on the CBRs of the plurality of carriers reported by a bottom layer. The terminal device selects the carrier according to the CBRs of the plurality of carriers that are obtained after filtering.

Optionally, if the method is performed by the network device, in 410, the obtaining CBRs of a plurality of candidate carriers includes: receiving, by the network device, the CBRs of the plurality of carriers reported by the terminal device.

For example, the network device may instruct the terminal device to measure the CBR of each carrier and report the measurement result to the network device.

Optionally, in 420, the performing filtering processing the CBRs of the plurality of carriers includes: performing smooth filtering for the CBRs of the plurality of carriers.

A method of smooth filtering is not limited in the embodiment of this application.

For example, a method of the smooth filtering may be CBR_new=a×CBR_old+(1−a)×CBR_current.

CBR_new is a CBR of each carrier that is obtained after filtering, CBR_current is a CBR of each carrier before filtering, CBR_old is a CBR of each carrier that is obtained after filtering during previous carrier selection, and a is a filtering coefficient and $0 \le a \le 1$.

It can be learnt that filtering a measured CBR by using a proper filtering method avoids a frequent carrier switching caused by a rapid change of the CBR.

Optionally, in 430, the selecting the carrier from the plurality of carriers according to the CBRs of the plurality of carriers that are obtained after filtering includes: selecting a carrier having the smallest CBR after filtering as a to-be-used carrier from the plurality of carriers according to the CBRs of the plurality of carriers that are obtained after filtering.

Three methods for triggering the terminal device or the network device to perform the carrier selection are further provided in the embodiments of this application based on the above carrier selection method. The following provides a specific description by using the terminal device as an example.

Method 1

Optionally, before 430, that is, before the selecting the carrier from the plurality of carriers according to the CBRs of the plurality of carriers that are obtained after filtering, the method further includes: determining whether a difference between a CBR of a first carrier that is obtained after filtering and a CBR of a second carrier that is obtained after filtering exceeds a preset threshold. The first carrier is a carrier used in current data transmission, and the second carrier is any carrier other than the first carrier in the plurality of carriers.

In 430, the selecting the carrier from the plurality of carriers according to the CBRs of the plurality of carriers that are obtained after filtering includes: if the difference between the CBR of the first carrier that is obtained after filtering and the CBR of the second carrier that is obtained after filtering exceeds the preset threshold, selecting the carrier from the plurality of carriers based on the CBRs of the plurality of carries that are obtained after filtering.

In this embodiment, whether carrier selection is performed is determined based on a difference between CBRs of a current carrier and another carrier, and the carrier is selected based on the CBRs that are obtained after the filtering processing when the difference between the CBRs satisfies a condition, further reducing carrier switching frequency and ensuring system stability.

Optionally, when the method is performed by the terminal device, before the determining whether a difference between a CBR of a first carrier that is obtained after filtering and a CBR of a second carrier that is obtained after filtering exceeds a preset threshold, the method further includes: obtaining, by the terminal device, the preset threshold preconfigured in the terminal device; or receiving, by the terminal device, configuration information sent by a network device, where the configuration information includes the preset threshold.

Optionally, when the method is performed by the network device, the method further includes: sending, by the network device, configuration information to the terminal device, where the configuration information includes the preset threshold.

For example, a quantity of the plurality of candidate carriers is N, and N is a positive integer greater than or equal to 2. Measured values of CBRs of the N carriers may be separately represented as $CBR_1$, $BCR_2$ . . . , and $CBR_N$. Assuming that a CBR of a carrier currently used by the terminal device is $CBR_1$, if $|CBR_1-CBR_k|>B$ is satisfied for any $CBR_k$ in the N CBRs, where B is a preset threshold, the terminal device is triggered to select the carrier. For example, the terminal device measures and filters the CBRs of the N carriers and selects a carrier having the smallest CBR as a to-be-used carrier from the N carriers based on the CBRs of the N carriers that are obtained after filtering. A preset threshold B herein may be preconfigured in the terminal device or the network device, for example, agreed on in a protocol; and the network device may indicate the preset threshold B to the terminal device through the configuration information.

Optionally, if the difference between the CBR of the first carrier that is obtained after filtering and the CBR of the second carrier that is obtained after filtering exceeds the preset threshold, the selecting the carrier from the plurality of carriers according to the CBRs of the plurality of carriers that are obtained after filtering includes: if the difference between the CBR of the first carrier that is obtained after filtering and the CBR of the second carrier that is obtained after filtering exceeds the preset threshold for preset duration, selecting the carrier from the plurality of carriers according to the CBRs of the plurality of carriers that are obtained after filtering.

Method 2

Optionally, in 430, the selecting the carrier from the plurality of carriers based on the CBRs of the plurality of carries that are obtained after filtering includes: selecting, when a value of a resource reselection counter C_resel is equal to 0, the carrier from the plurality of carriers according to the CBRs of the plurality of carriers that are obtained after filtering.

In this embodiment, a carrier selection process does not rely on a ProbResourceKeep parameter, and instead, whether the carrier selection needs to be performed currently is determined based on the resource reselection counter C_resel. When the carrier selection needs to be performed, the carrier is selected based on the CBRs that are obtained after filtering processing, reducing carrier switching frequency and ensuring system stability.

Optionally, a corresponding C_resel is configured on each of the plurality of carriers, where the selecting, when a value of C_resel is equal to 0, the carrier from the plurality of carriers according to the CBRs of the plurality of carriers includes: when a value of any C_resel in the plurality of C_resel configured for the plurality of carriers is equal to 0, selecting the carrier from the plurality of carriers according to the CBRs of the plurality of carriers.

In other words, the terminal device may configure an independent C_resel for a HARQ process on each carrier, and when the value of the C_resel corresponding to any carrier is equal to 0, the terminal device may be triggered to select the carrier.

Alternatively, optionally, a same C_resel is configured on the plurality of carriers, where the selecting, when a value of C_resel is equal to 0, the carrier from the plurality of carriers according to the CBRs of the plurality of carriers includes: when a value of the same C_resel is equal to 0, selecting the carrier from the plurality of carriers according to the CBRs of the plurality of carriers.

To be specific, the terminal device may also configure the same C_resel for the HARQs of the plurality of carriers, and when C_resel=0, the terminal device is triggered to select the carrier.

Method 3

Optionally, before 430, that is, before the selecting the carrier from the plurality of carriers according to the CBRs of the plurality of carriers that are obtained after filtering, the method further includes: determining, when the value of C_resel is equal to 0, whether a difference between a CBR of a first carrier that is obtained after filtering and a CBR of a second carrier that is obtained after filtering exceeds a preset threshold. The first carrier is a carrier used in current data transmission, and the second carrier is any carrier other than the first carrier in the plurality of carriers.

In 430, the selecting the carrier from the plurality of carriers according to the CBRs of the plurality of carriers that are obtained after filtering includes: if the difference between the CBR of the first carrier that is obtained after filtering and the CBR of the second carrier that is obtained after filtering exceeds the preset threshold, selecting the carrier from the plurality of carriers based on the CBRs of the plurality of carries that are obtained after filtering.

In this embodiment, whether the carrier needs to be selected currently is determined based on the resource reselection counter C_resel, and whether the difference between the CBRs of the current carrier and another carrier satisfies a condition is determined when the carrier needs to be selected. When the difference between the CBRs satisfies the condition, the carrier is selected based on the CBRs that are obtained after filtering processing, further reducing carrier switching frequency and ensuring system stability.

Specifically, when the value of C_resel is equal to 0, the terminal device is triggered to determine the difference between the CBRs. When the difference between the CBR of the first carrier that is obtained after filtering and the CBR of the second carrier that is obtained after filtering exceeds the preset threshold, the terminal device selects the carrier from a plurality of candidate carriers.

Optionally, the method is performed by a terminal device, and before the determining whether a difference between a CBR of a first carrier that is obtained after filtering and a CBR of a second carrier that is obtained after filtering exceeds a preset threshold, the method further includes: obtaining, by the terminal device, the preset threshold preconfigured in the terminal device; or receiving, by the terminal device, configuration information sent by a network device, where the configuration information includes the preset threshold.

Optionally, the method is performed by the network device, and the method further includes: sending, by the network device, configuration information to the terminal device, where the configuration information includes the preset threshold.

Optionally, a corresponding C_resel is configured on each of the plurality of carriers, where the determining, when the value of C_resel is equal to 0, whether a difference between a CBR of a first carrier that is obtained after filtering and a CBR of a second carrier that is obtained after filtering exceeds a preset threshold includes: when the value of C_resel corresponding to any carrier in the plurality of C_resel configured on the plurality of carriers is equal to 0, determining whether the difference between the CBR of the first carrier that is obtained after filtering and the CBR of the second carrier that is obtained after filtering exceeds the preset threshold.

Optionally, a same C_resel is configured on the plurality of carriers, where the determining, when the value of C_resel is equal to 0, whether a difference between a CBR of a first carrier that is obtained after filtering and a CBR of a second carrier that is obtained after filtering exceeds a preset threshold includes: when the value of the same C_resel is equal to 0, determining whether the difference between the CBR of the first carrier that is obtained after filtering and the CBR of the second carrier that is obtained after filtering exceeds the preset threshold.

It should be understood that the carrier selection method in the embodiments of this application may be applied to terminal devices using different transmission modes (for example, the transmission mode 3 or the transmission mode 4). When the terminal device uses the transmission mode 3, the network device may select a carrier based on the method and notify the terminal device of the carrier. When the terminal device uses the transmission mode 4, the terminal device may autonomously select a carrier by using the method. For a detailed carrier selection process of the network device, refer to the carrier selection process of the terminal device, and for brevity, details are not described herein again.

Figure 5:
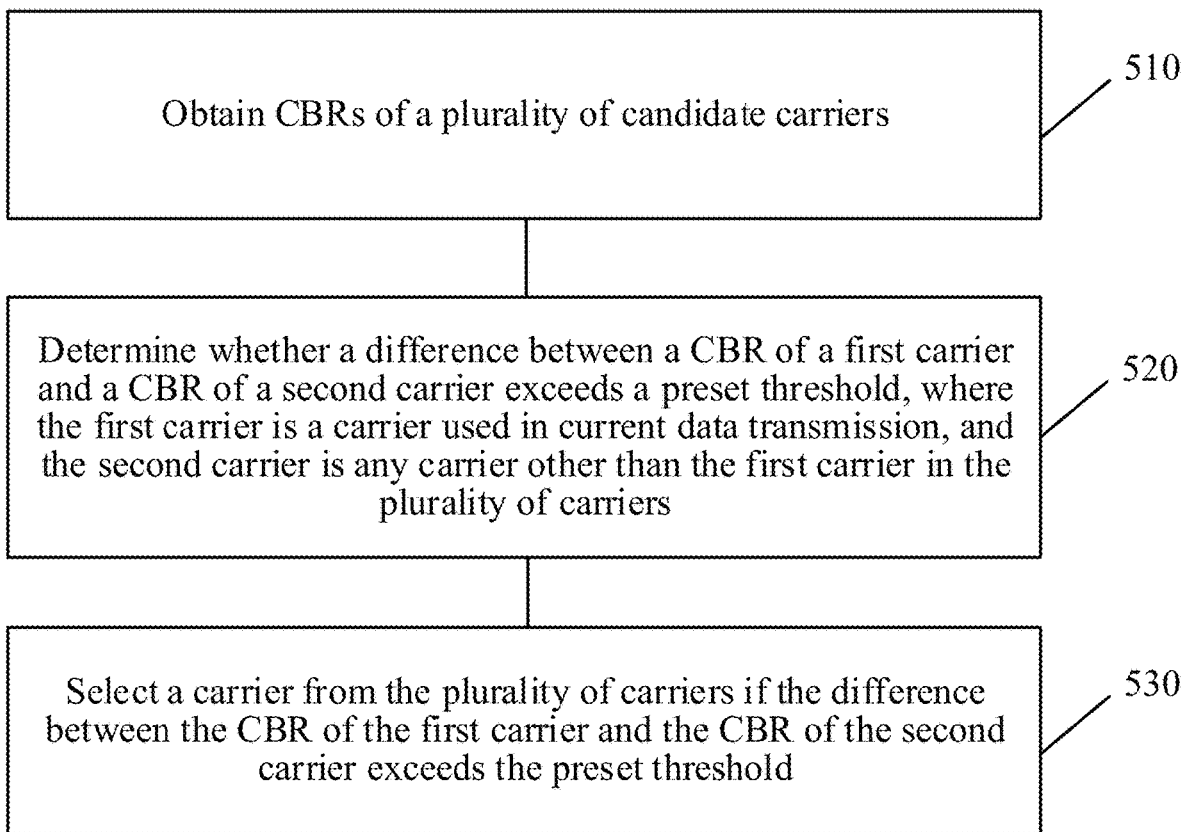
FIG. 5 is a schematic flowchart of a carrier selection method according to another embodiment of this application.

FIG. 5 is a schematic flowchart of a carrier selection method according to another embodiment of this application. The method shown in FIG. 5 may be performed by a communications device. The communications device includes a terminal device or a network device, the terminal device may be, for example, the terminal device 20 or the terminal device 30 shown in FIG. 2, and the network device may be, for example, the network device 10 shown in FIG. 1 or FIG. 2. The following provides a description by using the terminal device as an example, but the method described in this application may also be performed by the network device or the like. As shown in FIG. 5, the carrier selection method includes:

510: Obtain CBRs of a plurality of candidate carriers.

520: Determine whether a difference between a CBR of a first carrier and a CBR of a second carrier exceeds a preset threshold.

The first carrier is a carrier used in current data transmission, and the second carrier is any carrier other than the first carrier in the plurality of carriers.

530: If the difference between the CBR of the first carrier and the CBR of the second carrier exceeds the preset threshold, select a carrier from the plurality of carriers.

Specifically, the terminal device obtains a measurement result of the CBRs of the plurality of candidate carriers, and calculates a difference between the CBR of the first carrier used in current data transmission and a CBR of another carrier. When the difference between the CBR of the first carrier and the CBR of any other carrier exceeds the preset threshold, the terminal device is triggered to select the carrier. The terminal device may select a to-be-used carrier from the plurality of carriers during carrier selection according to the CBRs of the plurality of carriers. If the selected to-be-used carrier is the same as the carrier currently used by the terminal device, carrier switching may not be performed; otherwise, carrier switching is performed.

For example, a quantity of the plurality of candidate carriers is N, and N is a positive integer greater than or equal to 2. Measured values of CBRs of the N carriers may be separately represented as $CBR_1$, $BCR_2$ ..., and $CBR_N$. Assuming that a CBR of a carrier currently used by the terminal device is $CBR_1$, if $|CBR_1 - CBR_k| > B$ is satisfied for any $CBR_k$ in the N CBRs, where B is a preset threshold, the terminal device is triggered to select the carrier. For example, the terminal device measures the CBRs of the N carriers and selects a carrier having the smallest CBR as a to-be-used carrier from the N carriers based on the CBRs of the N carriers that are obtained.

Optionally, when the method is performed by the terminal device, in 510, the obtaining CBRs of a plurality of candidate carriers includes: measuring, by the terminal device, the CBRs of the plurality of carriers, to obtain the CBRs of the plurality of carriers.

Optionally, when the method is performed by the terminal device, before 520, that is, before the determining whether a difference between a CBR of a first carrier and a CBR of a second carrier exceeds a preset threshold, the method further includes: obtaining, by the terminal device, the preset threshold preconfigured in the terminal device; or receiving, by the terminal device, configuration information sent by the network device, where the configuration information includes the preset threshold.

Optionally, when the method is performed by the network device, in 510, the obtaining CBRs of a plurality of candidate carriers includes: receiving, by the network device, the CBRs of the plurality of carriers that are reported by the terminal device.

Optionally, when the method is performed by the network device, the method further includes: sending, by the network device, configuration information to the terminal device, where the configuration information includes the preset threshold.

Optionally, in 520, the determining whether a difference between a CBR of a first carrier and a CBR of a second carrier exceeds a preset threshold includes: determining, when a value of a resource reselection counter C_resel is equal to 0, whether the difference between the CBR of the first carrier and the CBR of the second carrier exceeds the preset threshold.

In this embodiment, the carrier selection process is irrelevant to a ProbResourceKeep parameter, that is, is independent of the ProbResourceKeep parameter. The terminal device determines, based on C_resel, whether a carrier needs to be selected currently, when a carrier needs to be selected, determines whether a difference between CBRs of the current carrier and another carrier satisfies the condition, and when the difference between the CBRs satisfies the condition, selects a carrier based on the CBRs of the different carriers, thereby reducing carrier switching frequency and ensuring system stability.

Optionally, each of the plurality of carriers is configured with a corresponding C_resel, where the determining, when a value of C_resel is equal to 0, whether the difference between the CBR of the first carrier that is obtained after filtering and the CBR of the second carrier that is obtained after filtering exceeds the preset threshold includes: when a value of any C_resel in the plurality of C_resel configured for the plurality of carriers is equal to 0, determining whether the difference between the CBR of the first carrier that is obtained after filtering and the CBR of the second carrier that is obtained after filtering exceeds the preset threshold.

In other words, the terminal device may configure an independent C_resel for a HARQ process on each carrier, and when C_resel corresponding to any carrier is equal to 0, the terminal device may be triggered to select the carrier.

Optionally, the plurality of carriers are configured with a same C_resel, where the determining, when a value of C_resel is equal to 0, whether the difference between the CBR of the first carrier that is obtained after filtering and the CBR of the second carrier that is obtained after filtering exceeds the preset threshold includes: when a value of the same C_resel is equal to 0, determining whether the difference between the CBR of the first carrier that is obtained after filtering and the CBR of the second carrier that is obtained after filtering exceeds the preset threshold.

To be specific, the terminal device may also configure the same C_resel for the HARQs of the plurality of carriers, and when C_resel=0, the terminal device is triggered to select the carrier.

Optionally, in 530, if the difference between the CBR of the first carrier and the CBR of the second carrier exceeds the preset threshold, the selecting a carrier from the plurality of carriers includes: if the difference between the CBR of the first carrier and the CBR of the second carrier exceeds the preset threshold for preset duration, selecting a carrier from the plurality of carriers.

Optionally, in 530, the selecting a carrier from the plurality of carriers includes: selecting a carrier having a smallest CBR as a to-be-used carrier from the plurality of carriers according to the CBRs of the plurality of carriers.

When the terminal device uses the transmission mode 3, the network device may select a carrier based on the method and notify the terminal device of the carrier. When the terminal device uses the transmission mode 4, the terminal device may autonomously select a carrier by using the method. For a detailed carrier selection process of the network device, refer to the carrier selection process of the terminal device, and for brevity, details are not described herein again.

Figure 6:
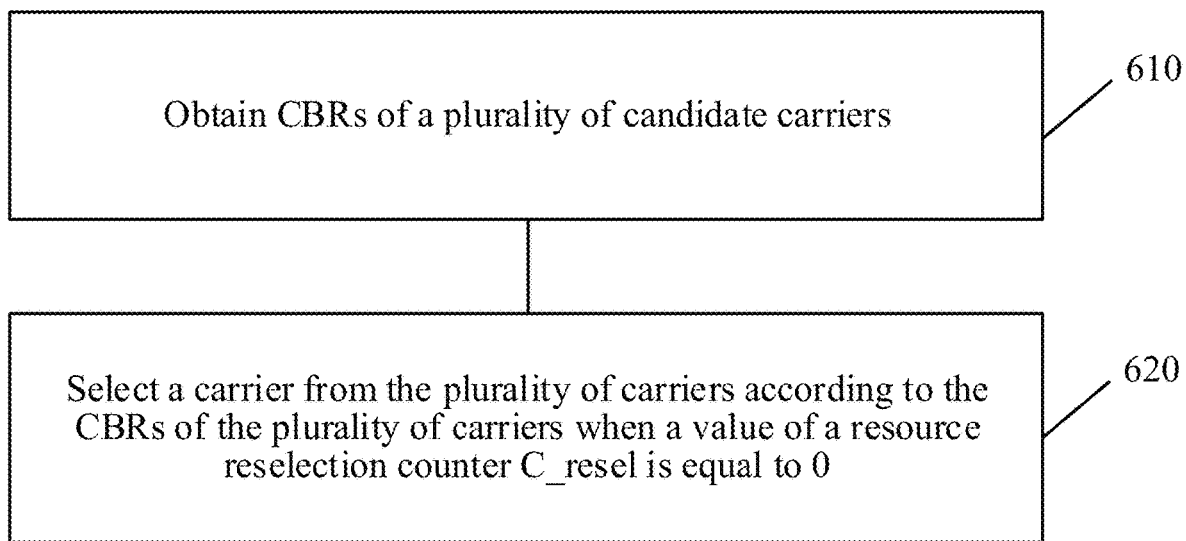
FIG. 6 is a schematic flowchart of a carrier selection method according to still another embodiment of this application.

FIG. 6 is a schematic flowchart of a carrier selection method according to still another embodiment of this application. The method shown in FIG. 6 may be performed by a communications device. The communications device includes a terminal device or a network device, the terminal device may be, for example, the terminal device 20 or the terminal device 30 shown in FIG. 2, and the network device may be, for example, the network device 10 shown in FIG. 1 or FIG. 2. The following provides a description by using the terminal device as an example, but the method described in this application may also be performed by the network device or the like. As shown in FIG. 6, the carrier selection method includes:

610: Obtain CBRs of a plurality of candidate carriers.

620: Select a carrier from the plurality of carriers according to the CBRs of the plurality of carriers when a value of a resource reselection counter C_resel is equal to 0.

Therefore, a carrier selection process does not rely on a ProbResourceKeep parameter, and instead, whether the carrier selection needs to be performed currently is determined based on the resource reselection counter C_resel. That is, the terminal device is triggered to select the carrier when C_resel=0, thereby reducing system complexity while effectively selecting the carrier.

Optionally, when the method is performed by the terminal device, in 610, the obtaining CBRs of a plurality of candidate carriers includes: measuring, by the terminal device, the CBRs of the plurality of carriers, to obtain the CBRs of the plurality of carriers.

Optionally, when the method is performed by the network device, in 610, the obtaining CBRs of a plurality of candidate carriers includes: receiving, by the network device, the CBRs of the plurality of carriers that are reported by the terminal device.

Optionally, each of the plurality of carriers is configured with a corresponding C_resel. In 620, the selecting a carrier from the plurality of carriers according to the CBRs of the plurality of carriers when a value of C_resel is equal to 0 includes: when a value of any C_resel in the plurality of C_resel configured for the plurality of carriers is equal to 0, selecting the carrier from the plurality of carriers according to the CBRs of the plurality of carriers.

Optionally, the plurality of carriers are configured with a same C_resel. In 620, the selecting a carrier from the plurality of carriers according to the CBRs of the plurality of carriers when a value of C_resel is equal to 0 includes: when a value of the same C_resel is equal to 0, selecting a carrier from the plurality of carriers according to the CBRs of the plurality of carriers.

To be specific, an independent resource reselection counter C_resel may be configured for a HARQ process of each of the plurality of candidate carriers, and when a value of any C_resel is equal to 0, the terminal device is triggered to select the carrier; or a same C_resel is configured for HARQ processes of all carriers, and when the C_resel is equal to 0, the terminal device is triggered to select the carrier.

Optionally, in 620, the selecting a carrier from the plurality of carriers according to the CBRs of the plurality of carriers includes: selecting a carrier having a smallest CBR as the to-be-used carrier from the plurality of carriers according to the CBRs of the plurality of carriers.

When the terminal device uses the transmission mode 3, the network device may select a carrier based on the method and notify the terminal device of the carrier. When the terminal device uses the transmission mode 4, the terminal device may autonomously select a carrier by using the method. For details of the carrier selection process of the network device, refer to related descriptions of the terminal device, and for brevity, details are not described herein again.

It should be further understood that in the embodiments of this application, serial numbers of the foregoing processes do not indicate an execution sequence, and an execution sequence of the processes should depend on functions and internal logic thereof, and constitutes no limitation on an implementation process of the embodiments of this application.

The foregoing describes the carrier selection method in the embodiments of this application in detail, the following describes an apparatus according to the embodiments of this application with reference to FIG. 7 to FIG. 11, and the technical features described in the method embodiment are applicable to the following apparatus embodiment.

Figure 7:
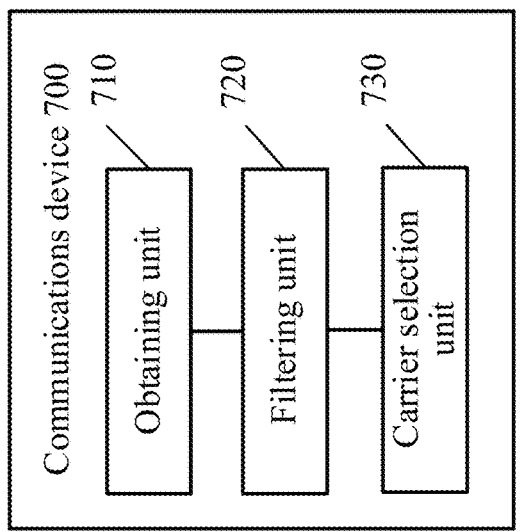
FIG. 7 is a schematic block diagram of a communications device according to an embodiment of this application.

FIG. 7 is a schematic block diagram of a communications device 700 according to an embodiment of this application. As shown in FIG. 7, the communications device 700 includes an obtaining unit 710, a filtering unit 720, and a carrier selection unit 730.

The obtaining unit 710 is configured to obtain channel busy ratios (CBR) of a plurality of candidate carriers.

The filtering unit 720 is configured to perform filtering processing on the CBRs of the plurality of carriers obtained by the obtaining unit 710, to obtain CBRs of the plurality of carriers after filtering.

The carrier selection unit 730 is configured to select a carrier from the plurality of carriers according to the CBRs of the plurality of carriers that are obtained after filtering by the filtering unit 720.

Therefore, filtering processing is performed on measured results of the CBRs of the plurality of carriers, and the carrier is selected from the plurality of carriers according to the CBRs of the plurality of carriers that are obtained after filtering processing, thereby reducing carrier switching frequency and ensuring system stability while the carrier is selected.

Optionally, the filtering unit 720 is specifically configured to perform smooth filtering on the CBRs of the plurality of carriers.

Optionally, a CBR of each of the plurality of carriers that is obtained after smooth filtering is: CBR_new=a×CBR_old+(1−a)×CBR_current, where CBR_new is a CBR of each carrier that is obtained after filtering, CBR_current is a CBR of each carrier before filtering, CBR_old is a CBR of each carrier that is obtained after filtering during previous carrier selection, and a is a filtering coefficient and $0 \leq a \leq 1$.

Optionally, the carrier selection unit 730 is specifically configured to: determine whether a difference between a CBR of a first carrier that is obtained after filtering and a CBR of a second carrier that is obtained after filtering exceeds a preset threshold, where the first carrier is a carrier used in current data transmission, and the second carrier is any carrier other than the first carrier in the plurality of carriers; and if the difference between the CBR of the first carrier that is obtained after filtering and the CBR of the second carrier that is obtained after filtering exceeds the preset threshold, select a carrier from the plurality of carriers according to the CBRs of the plurality of carriers that are obtained after filtering.

In this embodiment, whether carrier selection is performed is determined based on a difference between CBRs of a current carrier and another carrier, and the carrier is selected based on the CBRs that are obtained after the filtering processing when the difference between the CBRs satisfies a condition, further reducing carrier switching frequency and ensuring system stability.

Optionally, the communications device is a terminal device, and the terminal device includes a transceiver unit, where the obtaining unit 710 is further configured to: obtain the preset threshold preconfigured in the communications device; or receive, by using the transceiver unit, configuration information sent by the network device, where the configuration information includes the preset threshold.

Optionally, the communications device is a network device, and the network device includes a transceiver unit, where the transceiver unit is configured to: send configuration information to the terminal device, where the configuration information includes the preset threshold.

Optionally, the carrier selection unit 730 is specifically configured to: if the difference between the CBR of the first carrier that is obtained after filtering and the CBR of the second carrier that is obtained after filtering exceeds the preset threshold for preset duration, select a carrier from the plurality of carriers according to the CBRs of the plurality of carriers.

Optionally, the carrier selection unit 730 is specifically configured to: when a value of a resource reselection counter C_resel is equal to 0, select a carrier from the plurality of carriers according to the CBRs of the plurality of carriers that are obtained after filtering.

In this embodiment, a carrier selection process does not rely on a ProbResourceKeep parameter, and instead, whether the carrier selection needs to be performed currently is determined based on the resource reselection counter C_resel. When the carrier selection needs to be performed, the carrier is selected based on the CBRs that are obtained after filtering processing, reducing carrier switching frequency and ensuring system stability.

Optionally, a corresponding C_resel is configured for each of the plurality of carriers, where the carrier selection unit 730 is specifically configured to: when a value of any C_resel in the plurality of C_resel configured for the plurality of carriers is equal to 0, select a carrier from the plurality of carriers according to the CBRs of the plurality of carriers that are obtained after filtering.

Optionally, a same C_resel is configured for the plurality of carriers, where the carrier selection unit 730 is specifically configured to: when a value of the same C_resel is equal to 0, select a carrier from the plurality of carriers according to the CBRs of the plurality of carriers that are obtained after filtering.

Optionally, the carrier selection unit 730 is specifically configured to: when the value of C_resel is equal to 0, determine whether a difference between a CBR of a first carrier that is obtained after filtering and a CBR of a second carrier that is obtained after filtering exceeds a preset threshold, where the first carrier is a carrier used in current data transmission, and the second carrier is any carrier other than the first carrier in the plurality of carriers; and if the difference between the CBR of the first carrier that is obtained after filtering and the CBR of the second carrier that is obtained after filtering exceeds the preset threshold, select a carrier from the plurality of carriers according to the CBRs of the plurality of carriers that are obtained after filtering.

In this embodiment, whether the carrier needs to be selected currently is determined based on the resource reselection counter C_resel, and whether the difference between the CBRs of the current carrier and another carrier satisfies a condition is determined when the carrier needs to be selected. When the difference between the CBRs satisfies the condition, the carrier is selected based on the CBRs that are obtained after filtering processing, further reducing carrier switching frequency and ensuring system stability.

Optionally, the communications device is a terminal device, and the terminal device includes a transceiver unit, where the obtaining unit 710 is further configured to: obtain the preset threshold preconfigured in the communications device; or receive, by using the transceiver unit, configuration information sent by the network device, where the configuration information includes the preset threshold.

Optionally, the communications device is a network device, and the network device includes a transceiver unit, where the transceiver unit is configured to: send configuration information to the terminal device, where the configuration information includes the preset threshold.

Optionally, a corresponding C_resel is configured for each of the plurality of carriers, where the carrier selection unit 730 is specifically configured to: when the value of any C_resel in the plurality of C_resel configured for the plurality of carriers is equal to 0, determine whether the difference between the CBR of the first carrier that is obtained after filtering and the CBR of the second carrier that is obtained after filtering exceeds the preset threshold.

Optionally, a same C_resel is configured for the plurality of carriers, where the carrier selection unit 730 is specifically configured to: when the value of the same C_resel is equal to 0, determine whether the difference between the CBR of the first carrier that is obtained after filtering and the CBR of the second carrier that is obtained after filtering exceeds the preset threshold.

Optionally, the carrier selection unit 730 is specifically configured to: select a carrier having a smallest CBR obtained after filtering as a to-be-used carrier from the plurality of carriers according to the CBRs of the plurality of carriers that are obtained after filtering.

Optionally, the communications device is a terminal device, and the obtaining unit 710 is specifically configured to: measure the CBRs of the plurality of carriers, to obtain the CBRs of the plurality of carriers.

Optionally, the communications device is a network device, and the network device includes a transceiver unit, where the obtaining unit 710 is specifically configured to: receive, by using the transceiver unit, the CBRs of the plurality of carriers that are reported by the terminal device.

Optionally, the carrier selection process is irrelevant to a probability resource keep ProbResourceKeep parameter.

It should be understood that the communications device 700 may perform the corresponding operations of the method 400 performed by the communications device in the foregoing method embodiments, and for brevity, details are not described herein again.

Figure 8:
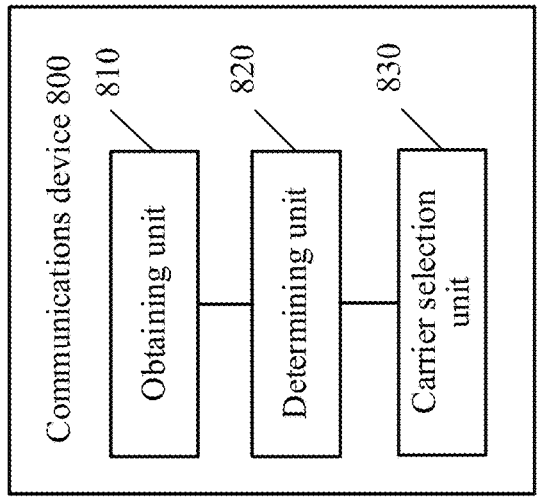
FIG. 8 is a schematic block diagram of a communications device according to another embodiment of this application.

FIG. 8 is a schematic block diagram of a communications device 800 according to an embodiment of this application. As shown in FIG. 8, the communications device 800 includes an obtaining unit 810, a determining unit 820, and a carrier selection unit 830.

The obtaining unit 810 is configured to obtain channel busy ratios (CBR) of a plurality of candidate carriers.

The determining unit 820 is configured to determine whether a difference between a CBR of a first carrier and a CBR of a second carrier exceeds a preset threshold, where the first carrier is a carrier used in current data transmission, and the second carrier is any carrier other than the first carrier in the plurality of carriers.

The carrier selection unit 830 is configured to: when the difference between the CBR of the first carrier and the CBR of the second carrier exceeds the preset threshold, select a carrier from the plurality of carriers obtained by the obtaining unit 810.

Therefore, whether carrier selection is performed is determined by determining a difference between CBRs of a current carrier and another carrier, and the carrier is selected only when the difference between the CBRs satisfies a condition, reducing carrier switching frequency and ensuring system stability.

Optionally, the carrier selection unit 830 is specifically configured to: if the difference between the CBR of the first carrier and the CBR of the second carrier exceeds the preset threshold for preset duration, select a carrier from the plurality of carriers according to the CBRs of the plurality of carriers.

Optionally, the determining unit 820 is specifically configured to: when a value of a resource reselection counter C_resel is equal to 0, determine whether the difference between the CBR of the first carrier and the CBR of the second carrier exceeds the preset threshold.

In this embodiment, whether the carrier needs to be selected currently is determined based on the resource reselection counter C_resel, and whether the difference between the CBRs of the current carrier and another carrier satisfies a condition is determined when the carrier needs to be selected. When the difference between the CBRs satisfies the condition, the carrier is selected based on CBRs of different carriers, thereby reducing carrier switching frequency and ensuring system stability.

Optionally, a corresponding C_resel is configured for each of the plurality of carriers, where the determining unit 820 is specifically configured to: when a value of any C_resel in the plurality of C_resel configured for the plurality of carriers is equal to 0, determine whether the difference between the CBR of the first carrier that is obtained after filtering and the CBR of the second carrier that is obtained after filtering exceeds the preset threshold.

Optionally, a same C_resel is configured for the plurality of carriers, where the determining unit 820 is specifically configured to: when a value of the same C_resel is equal to 0, determine whether the difference between the CBR of the first carrier that is obtained after filtering and the CBR of the second carrier that is obtained after filtering exceeds the preset threshold.

Optionally, the carrier selection unit 830 is specifically configured to: select a carrier having a smallest CBR as a to-be-used carrier from the plurality of carriers according to the CBRs of the plurality of carriers.

Optionally, the communications device is a terminal device, and the obtaining unit 810 is specifically configured to: measure the CBRs of the plurality of carriers, to obtain the CBRs of the plurality of carriers.

Optionally, the terminal device includes a transceiver unit, where the obtaining unit 810 is further configured to: obtain the preset threshold preconfigured in the terminal device; or receive, by using the transceiver unit, configuration information sent by the network device, where the configuration information includes the preset threshold.

Optionally, the communications device is performed by a network device, and the network device includes a transceiver unit, where the obtaining unit 810 is specifically configured to: receive, by using the transceiver unit, the CBRs of the plurality of carriers that are reported by the terminal device.

Optionally, the network device includes a transceiver unit, and the transceiver unit is configured to: send configuration information to the terminal device, where the configuration information includes the preset threshold.

Optionally, the carrier selection process is irrelevant to a probability resource keep ProbResourceKeep parameter.

It should be understood that the communications device 800 may perform the corresponding operations of the method 500 performed by the communications device in the foregoing method embodiments, and for brevity, details are not described herein again.

Figure 9:
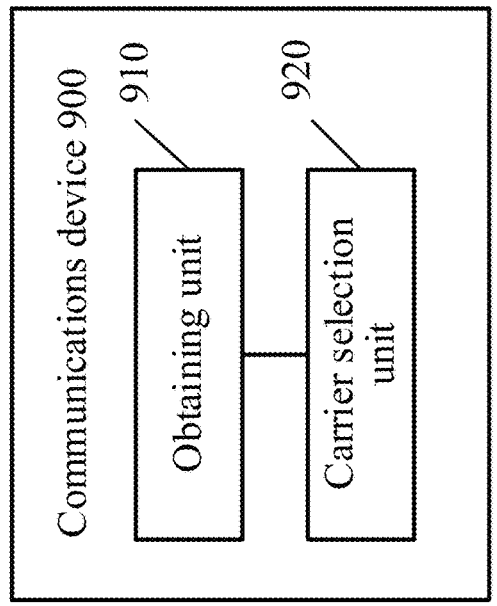
FIG. 9 is a schematic block diagram of a communications device according to still another embodiment of this application.

FIG. 9 is a schematic block diagram of a communications device 900 according to an embodiment of this application. As shown in FIG. 9, the communications device 900 includes an obtaining unit 910 and a carrier selection unit 920.

The obtaining unit 910 is configured to obtain channel busy ratios (CBR) of a plurality of candidate carriers; and The carrier selection unit 920 is configured to: when a value of a resource reselection counter C_resel is equal to 0, select a carrier from the plurality of carriers according to the CBRs of the plurality of carriers that are obtained by the obtaining unit.

Therefore, a carrier selection process does not rely on a probability resource keep ProbResourceKeep parameter, and instead, whether the carrier selection needs to be performed currently is determined based on the resource reselection counter C_resel, implementing effective carrier selection and reducing system complexity.

Optionally, a corresponding C_resel is configured for each of the plurality of carriers, where the carrier selection unit 920 is specifically configured to: when a value of any C_resel in the plurality of C_resel configured for the plurality of carriers is equal to 0, select a carrier from the plurality of carriers according to the CBRs of the plurality of carriers.

Optionally, a same C_resel is configured for the plurality of carriers, where the carrier selection unit 920 is specifically configured to: when a value of the same C_resel is equal to 0, select a carrier from the plurality of carriers according to the CBRs of the plurality of carriers.

Optionally, the carrier selection unit 920 is specifically configured to: select a carrier having a smallest CBR as a to-be-used carrier from the plurality of carriers according to the CBRs of the plurality of carriers.

Optionally, the communications device is a terminal device, and the obtaining unit 910 is specifically configured to: measure the CBRs of the plurality of carriers, to obtain the CBRs of the plurality of carriers.

Optionally, the communications device is a network device, and the network device includes a transceiver unit, where the obtaining unit 910 is specifically configured to: receive, by using the transceiver unit, the CBRs of the plurality of carriers reported by the terminal device.

Optionally, the carrier selection process is irrelevant to a probability resource keep ProbResourceKeep parameter.

It should be understood that the communications device 900 may perform the corresponding operations of the method 600 performed by the communications device in the foregoing method embodiments, and for brevity, details are not described herein again.

Figure 10:
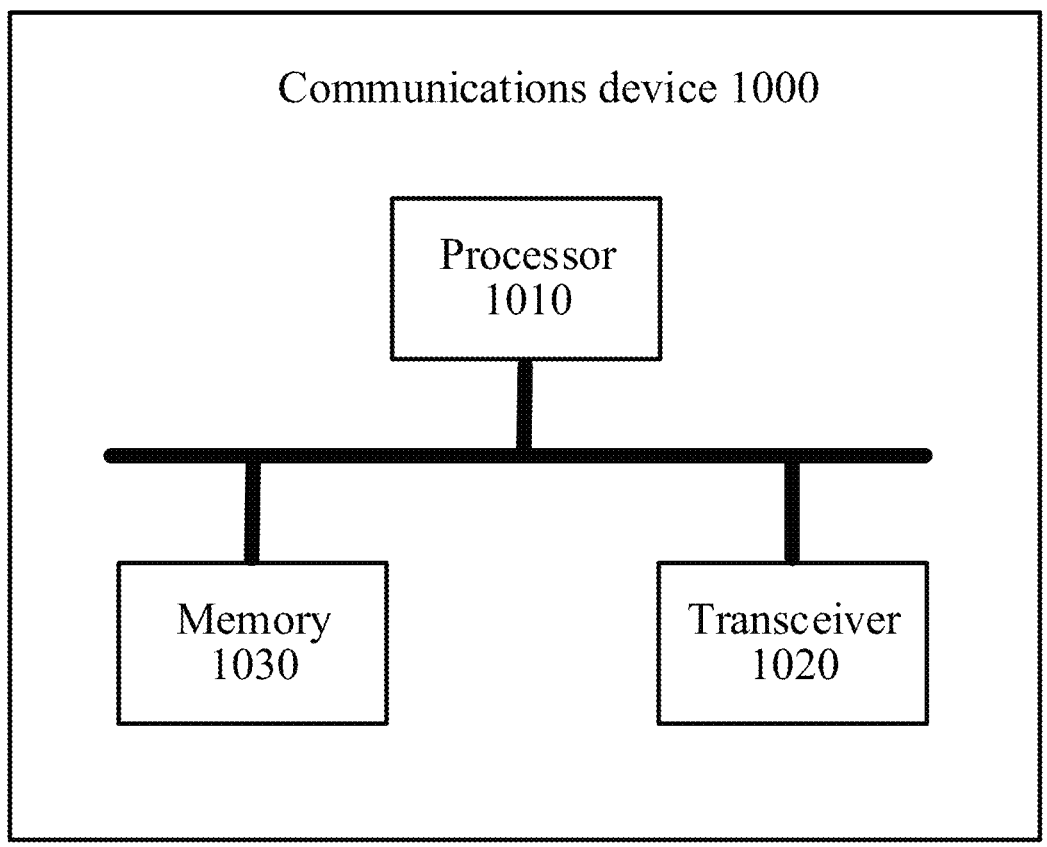
FIG. 10 is a schematic structural diagram of a communications device according to an embodiment of this application.

FIG. 10 is a schematic structural diagram of a communications device 1000 according to an embodiment of this application. As shown in FIG. 10, the communications device includes a processor 1010, a transceiver 1020, and a memory 1030, where the processor 1010, the transceiver 1020, and the memory 1030 communicate through an internal connection path. The memory 1030 is configured to store an instruction, and the processor 1010 is configured to execute the instruction stored in the memory 1030, to control the transceiver 1020 to receive a signal or send a signal.

Optionally, the processor 1010 may invoke program code stored in the memory 1030, to perform the corresponding operations of the method 400 performed by the communications device in the foregoing method embodiment, and for brevity, details are not described herein again.

Optionally, the processor 1010 may invoke program code stored in the memory 1030, to perform the corresponding operations of the method 500 performed by the communications device in the foregoing method embodiment, and for brevity, details are not described herein again.

Optionally, the processor 1010 may invoke program code stored in the memory 1030, to perform the corresponding operations of the method 600 performed by the communications device in the foregoing method embodiment, and for brevity, details are not described herein again.

It should be understood that the processor in the embodiments of this application may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware thereof.

It may be understood that the memory in the embodiments of this application may be a volatile memory or a nonvolatile memory, or may include both of a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

Figure 11:
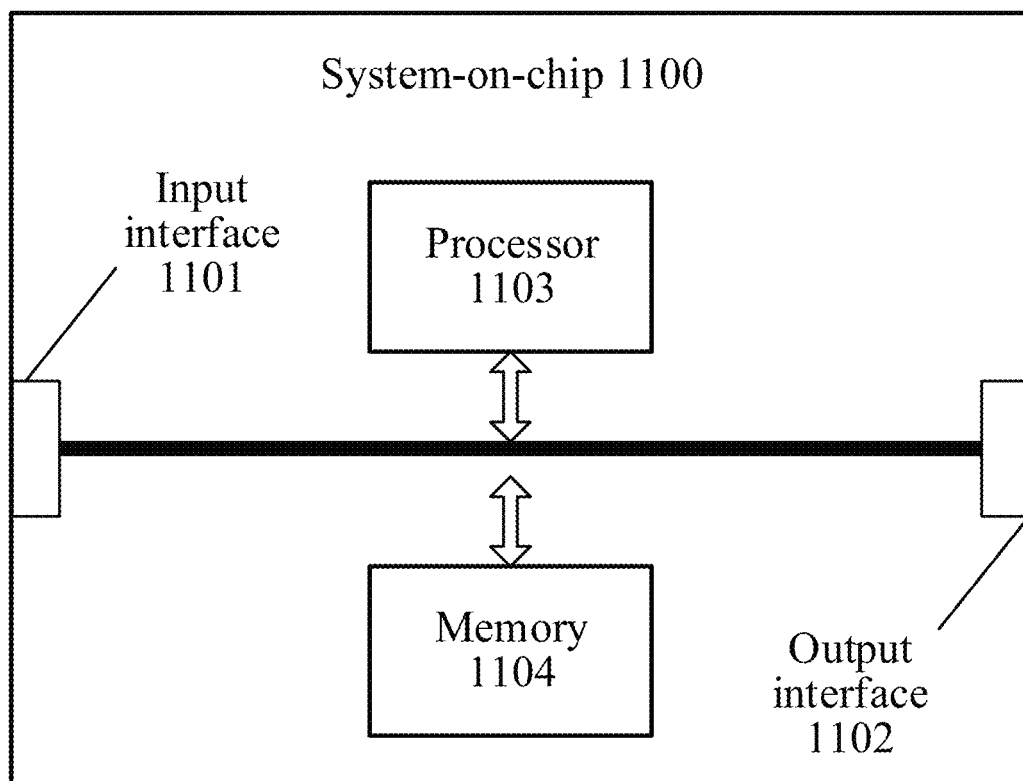
FIG. 11 is a schematic structural diagram of a system-on-chip according to an embodiment of this application.

FIG. 11 is a schematic structural diagram of a system-on-chip according to an embodiment of this application. The chip 1100 in FIG. 11 includes an input interface 1101, an output interface 1102, at least one processor 1103, and a memory 1104. The input interface 1101, the output interface 1102, the processor 1103, and the memory 1104 are connected through an internal connection path. The processor 1103 is configured to execute code in the memory 1104.

Optionally, when the code is executed, the processor 1103 may perform the method 400 performed by the communications device in the foregoing method embodiment, and for brevity, details are not described herein again.

Optionally, when the code is executed, the processor 1103 may perform the method 500 performed by the communications device in the foregoing method embodiment, and for brevity, details are not described herein again.

Optionally, when the code is executed, the processor 1103 may perform the method 600 performed by the communications device in the foregoing method embodiment, and for brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly learn that for ease of convenient and concise descriptions, for specific working processes of the system, apparatus, and unit described above, refer to corresponding processes in the method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one monitoring unit, or each of the units may exist alone physically, or two or more units are integrated into one unit.

When the function is implemented in the form of a software functional unit and sold or used as an independent product, the function may be stored in a computer-readable storage medium. Based on such an understanding, the technical solutions of this application essentially, or the part contributing to the prior art, or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A carrier selection method comprising:
   obtaining channel busy ratios (CBRs) of a plurality of candidate carriers; and
   decreasing by one value of a resource reselection counter each time data is transmitted over a time frequency resource; and
   when a value of the resource reselection counter is equal to 0, selecting one or more carriers from the plurality of candidate carriers according to the CBRs of the plurality of candidate carriers, and resetting the resource reselection counter,
   wherein the selecting one or more carriers from the plurality of candidate carriers according to the CBRs of the plurality of candidate carriers comprises:
   selecting one or more carriers having a smallest CBR as to-be-used carriers from the plurality of candidate carriers according to the CBRs of the plurality of candidate carriers.

2. The method of claim 1 wherein each of the plurality of candidate carriers is configured with a corresponding resource reselection counter, and wherein when a value of the resource reselection counter is equal to 0, selecting one or more carriers from the plurality of candidate carriers according to the CBRs of the plurality of candidate carriers comprises:
   when a value of any resource reselection counter in a plurality of resource reselection counters configured for the plurality of candidate carriers is equal to 0, selecting one or more carriers from the plurality of candidate carriers according to the CBRs of the plurality of candidate carriers.

3. The method of claim 1 wherein the plurality of candidate carriers are configured with a same resource reselection counter, and wherein when a value of the resource reselection counter is equal to 0, selecting one or more carriers from the plurality of candidate carriers according to the CBRs of the plurality of candidate carriers comprises:
   when a value of the same resource reselection counter is equal to 0, selecting one or more carriers from the plurality of candidate carriers according to the CBRs of the plurality of candidate carriers.

4. The method of claim 1 wherein the method is performed by a terminal device, and wherein obtaining CBRs of the plurality of candidate carriers comprises:
   measuring, by the terminal device, the CBRs of the plurality of candidate carriers, to obtain the CBRs of the plurality of candidate carriers.

5. The method of claim 1 wherein the method is performed by a network device, and wherein obtaining CBRs of the plurality of candidate carriers comprises receiving, by the network device, the CBRs of the plurality of candidate carriers that are reported by a terminal device.

6. The method of claim 1 wherein selecting one or more carriers from the plurality of candidate carriers is irrelevant to a probability resource keep parameter.

7. A communications device comprising:
   a processor;
   a memory configured to store an instruction,
   wherein the processor is configured to execute the instruction to:
   obtain channel busy ratios (CBRs) of a plurality of candidate carriers; and
   decrease by one value of a resource reselection counter each time data is transmitted over a time frequency resource; and
   when a value of the resource reselection counter is equal to 0, select one or more carriers from the plurality of candidate carriers according to the CBRs of the plurality of candidate carriers and reset the resource reselection counter,
   wherein the processor is configured to execute the instruction to select one or more carriers having a smallest CBR as to-be-used carriers from the plurality of candidate carriers according to the CBRs of the plurality of candidate carriers.

8. The communications device of claim 7 wherein a corresponding resource reselection counter is configured for each of the plurality of candidate carriers, and wherein the processor is configured to execute the instruction to:
   when a value of any resource reselection counter in a plurality of resource reselection counters configured for the plurality of candidate carriers is equal to 0, select one or more carriers from the plurality of candidate carriers according to the CBRs of the plurality of candidate carriers.

9. The communications device of claim 7 wherein a same resource reselection counter is configured for the plurality of candidate carriers, and wherein the processor is configured to execute the instruction to:
   when a value of the same resource reselection counter is equal to 0, select one or more carriers from the plurality of candidate carriers according to the CBRs of the plurality of candidate carriers.

10. The communications device of claim 7 wherein the communications device is a terminal device, and the processor is configured to execute the instruction to measure the CBRs of the plurality of candidate carriers, to obtain the CBRs of the plurality of candidate carriers.

11. The communications device of claim 7 wherein the communications device is a network device, and the network device comprises a transceiver, wherein the processor is configured to execute the instruction to control the transceiver to receive the CBRs of the plurality of candidate carriers reported by a terminal device.

12. The communications device of claim 7 wherein selecting one or more carriers from the plurality of candidate carriers is irrelevant to a probability resource keep parameter.

13. One or more non-transitory computer-storage media storing instructions that, upon execution on a computer system, cause the computer system to perform operations including:
   obtaining channel busy ratios (CBRs) of a plurality of candidate carriers;
   decreasing by one value of a resource reselection counter each time data is transmitted over a time frequency resource; and
   when a value of the resource reselection counter is equal to 0, selecting one or more carriers from the plurality of candidate carriers according to the CBRs of the plurality of candidate carriers, and resetting the resource reselection counter,
   wherein the operation of selecting one or more carriers from the plurality of candidate carriers according to the CBRs of the plurality of candidate carriers comprises:
   selecting one or more carriers having a smallest CBR as to-be-used carriers from the plurality of candidate carriers according to the CBRs of the plurality of candidate carriers.

14. The one or more non-transitory computer-storage media of claim 13 wherein each of the plurality of candidate carriers is configured with a corresponding resource reselection counter, and wherein when a value of the resource reselection counter is equal to 0, selecting one or more carriers from the plurality of candidate carriers according to the CBRs of the plurality of candidate carriers comprises:

when a value of any resource reselection counter in a plurality of resource reselection counters configured for the plurality of candidate carriers is equal to 0, selecting a carrier from the plurality of candidate carriers according to the CBRs of the plurality of candidate carriers.

15. The one or more non-transitory computer-storage media of claim 13 wherein the plurality of candidate carriers are configured with a same resource reselection counter, and wherein when a value of the resource reselection counter is equal to 0, selecting one or more carriers from the plurality of candidate carriers according to the CBRs of the plurality of candidate carriers comprises:

when a value of the same resource reselection counter is equal to 0, selecting a-one or more carriers from the plurality of candidate carriers according to the CBRs of the plurality of candidate carriers.

16. The one or more non-transitory computer-storage media of claim 13 wherein the operations are performed by a terminal device, and the obtaining CBRs of the plurality of candidate carriers comprises:

measuring, by the terminal device, the CBRs of the plurality of candidate carriers, to obtain the CBRs of the plurality of candidate carriers.

17. The one or more non-transitory computer-storage media of claim 13 wherein the operations are performed by a network device, and wherein obtaining CBRs of the plurality of candidate carriers comprises receiving, by the network device, the CBRs of the plurality of candidate carriers that are reported by a terminal device.

* * * * *